(12) United States Patent
Gorman

(10) Patent No.: US 12,320,819 B2
(45) Date of Patent: *Jun. 3, 2025

(54) COORDINATED CONVEYERS IN AN AUTOMATED SYSTEM

(71) Applicant: Team Conveyer Royalty A LLC, Del Mar, CA (US)

(72) Inventor: John G. Gorman, Del Mar, CA (US)

(73) Assignee: Team Conveyer Royalty A LLC, Del Mar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,841

(22) Filed: Sep. 11, 2023

(65) Prior Publication Data

US 2023/0417782 A1 Dec. 28, 2023

Related U.S. Application Data

(63) Continuation of application No. 16/578,108, filed on Sep. 20, 2019, now Pat. No. 11,754,576.

(Continued)

(51) Int. Cl.
*G01N 35/00* (2006.01)
*B01L 3/00* (2006.01)
(Continued)

(52) U.S. Cl.
CPC ........ *G01N 35/0092* (2013.01); *B01L 3/5085* (2013.01); *B04B 5/0407* (2013.01);
(Continued)

(58) Field of Classification Search
None
See application file for complete search history.

(56) References Cited

U.S. PATENT DOCUMENTS

| 3,679,129 A | 7/1972 | Livshitz et al. |
| 4,224,979 A | 9/1980 | Rosin et al. |

(Continued)

FOREIGN PATENT DOCUMENTS

| CN | 102725213 A | 10/2012 |
| CN | 107406151 A1 | 11/2017 |

(Continued)

OTHER PUBLICATIONS

Notice of Allowance for U.S. Appl. No. 17/963,985, dated Mar. 20, 2024, 9 pgs.

(Continued)

*Primary Examiner* — P. Kathryn Wright
(74) *Attorney, Agent, or Firm* — Procopio, Cory, Hargreaves & Savitch LLP

(57) ABSTRACT

Coordinated conveyors in an automated system. A system comprises a plurality of conveyors, which each comprise a plurality of segments, and one or more stations. An instruction is received to perform an operation that requires at least one station to process at least a first item held by a first segment of a first conveyor and a second item held by a second segment of a second conveyor. In response to the instruction, one or both of the first and second conveyors are moved, such that the first segment and the second segment are aligned at the station. After alignment, one or more instruments of the station process the first item and the second item.

18 Claims, 8 Drawing Sheets

Related U.S. Application Data

(60) Provisional application No. 62/742,830, filed on Oct. 8, 2018.

(51) Int. Cl.
  *B04B 5/04* (2006.01)
  *B04B 13/00* (2006.01)
  *B04B 15/02* (2006.01)
  *G01N 35/04* (2006.01)
  *G01N 35/10* (2006.01)

(52) U.S. Cl.
  CPC ............. *B04B 13/00* (2013.01); *B04B 15/02* (2013.01); *G01N 35/00732* (2013.01); *G01N 35/04* (2013.01); *G01N 35/1002* (2013.01); *B01L 2200/025* (2013.01); *B01L 2300/1805* (2013.01); *G01N 2035/00356* (2013.01); *G01N 2035/0446* (2013.01); *G01N 2035/0449* (2013.01); *G01N 2035/0455* (2013.01); *G01N 2035/0458* (2013.01)

(56) References Cited

U.S. PATENT DOCUMENTS

| | | | |
|---|---|---|---|
| 4,715,920 | A | 12/1987 | Ruppman et al. |
| 4,958,716 | A | 9/1990 | Matsuo et al. |
| 5,244,633 | A | 9/1993 | Jakubowicz et al. |
| 9,604,787 | B1 | 3/2017 | Baek |
| 9,688,479 | B1 | 6/2017 | Gorski et al. |
| 10,689,200 | B1 | 6/2020 | Lwali et al. |
| 11,754,576 | B2 * | 9/2023 | Gorman ............... G01N 35/025 700/266 |
| 2005/0133340 | A1 | 6/2005 | Horn |
| 2007/0087429 | A1 | 4/2007 | Tanimoto et al. |
| 2007/0261997 | A1 | 11/2007 | Cassady et al. |
| 2008/0181753 | A1 | 7/2008 | Bastian et al. |
| 2010/0316468 | A1 | 12/2010 | Lert et al. |
| 2013/0015675 | A1 | 1/2013 | Pickard et al. |
| 2014/0244026 | A1 | 8/2014 | Neiser |
| 2015/0058178 | A1 | 2/2015 | Chirnomas |
| 2015/0095254 | A1 | 4/2015 | Naber et al. |
| 2016/0244184 | A1 | 8/2016 | Nderman et al. |
| 2017/0200248 | A1 | 7/2017 | Murphy |
| 2017/0269112 | A1 | 9/2017 | Gerstel |
| 2017/0273193 | A1 | 9/2017 | Sari et al. |
| 2017/0283185 | A1 | 10/2017 | Gorski |
| 2017/0349385 | A1 | 12/2017 | Moroni et al. |
| 2018/0135093 | A1 | 5/2018 | Ashby et al. |
| 2018/0311704 | A1 | 11/2018 | Gil |
| 2019/0099783 | A1 | 4/2019 | Ohtsubo et al. |
| 2019/0332096 | A1 | 10/2019 | Porter et al. |
| 2020/0156868 | A1 | 5/2020 | Bidram et al. |
| 2020/0324974 | A1 | 10/2020 | Gorman |

FOREIGN PATENT DOCUMENTS

| | | |
|---|---|---|
| CN | 108492475 A | 9/2018 |
| CN | 109583800 A | 4/2019 |
| JP | S48086264 A | 11/1973 |
| JP | S61114907 A | 6/1986 |
| JP | H01247302 A | 10/1989 |
| JP | 2006151649 A | 6/2006 |
| JP | 2013245087 A | 12/2013 |
| WO | 2020210001 A1 | 3/2020 |

OTHER PUBLICATIONS

International Search Report and Written Opinion for PCT Application No. PCT/US2020/023718, dated Jun. 12, 2020, 20 pages.
Smith, et al., Abbott AxSYM Random and Continuous Immunoassay System for Improved Workflow in the Clinical Laboratory, Clinical Chemistry, vol. 39, No. 10, 1993, pp. 2063-2069, 7 pages.
Notice of Reason for Rejection for JP App No. 2023-065956 dated May 28, 2024, 13 pgs.

* cited by examiner

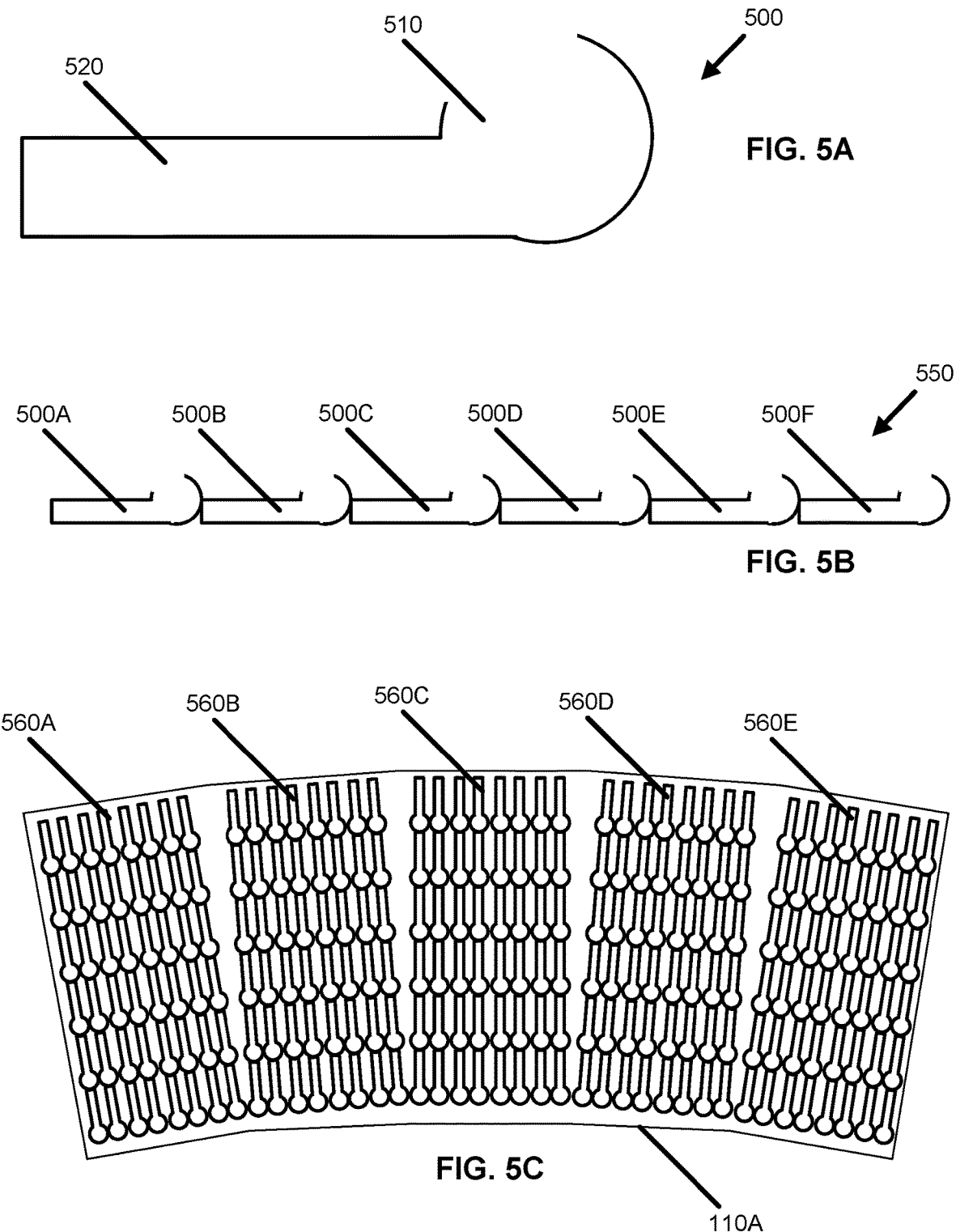

COORDINATED CONVEYERS IN AN AUTOMATED SYSTEM

CROSS-REFERENCE TO RELATED APPLICATIONS

This application is a continuation application of U.S. patent application Ser. No. 16/578,108, filed on Sep. 20, 2019, which claims priority to U.S. Provisional Patent App. No. 62/742,830, filed on Oct. 8, 2018, which is hereby incorporated herein by reference as if set forth in full.

BACKGROUND

Field of the Invention

The embodiments described herein are generally directed to automation, and, more particularly, to the coordination of a plurality of conveyors within an automated system.

Description of the Related Art

Many automated systems utilize complex robotics to move items within the system. Such robotics generally require multiple mechanical systems that perform complex movement in at least three dimensions. In addition, items must generally be moved between different areas within the automated system (e.g., by robotic grippers) that are responsible for different processes.

As one example of a system in which automation would be useful, before a blood transfusion can be performed, both the donor and patient blood must undergo extensive diagnostic testing in laboratories. The required diagnostic tests can be divided into two distinct classes: (1) immunohematology (IH) tests for red-blood cell antigens and antibodies; and (2) tests for viral and other infectious-disease markers to exclude donor blood that may transmit infectious diseases.

More than a century of research has identified and named about thirty clinically significant red-blood-cell antigens and corresponding antibodies that can cause transfusion reactions of varying degrees. This is the field of IH, in which tests either identify blood groups of patients or donor red-blood cells, or detect the presence and determine the identity of red-blood-cell antibodies in blood samples. IH pre-transfusion testing requires that specific procedures be performed, including, for example, antigen typing, antibody identification, and cross-matching, to ensure that transfusion blood is compatible with the patient.

Donors must also be screened for risk of infectious disease. This involves testing donor blood samples for infectious-disease antigens and antibodies. Infectious diseases, currently required to be tested by immunological methods, are Cytomegalovirus (CMV), syphilis, hepatitis B (HBV) (comprising HBV surface antigen and core antibody), hepatitis C (HCV), human immunodeficiency virus (HIV) (comprising HIV types 1 and 2), human T-lymphotropic antibodies (HTLV), Chagas disease, Zika, and West Nile virus. In addition, minipool nucleic acid testing (NAT) is mandated for the presence of certain viruses in donor samples, including HIV, HBV, HCV, and West Nile virus. Presently, such tests are not done on automated IH systems, but could be upon advent of a pathogen-screening red-blood-cell reagent.

Column agglutination technology (CAT) has emerged as the standard for pre-transfusion blood testing, replacing nearly all competitive methods. Conventional CAT utilizes gel cards with six to eight wells. Because of the gel card's historical strengths, efforts in automating IH testing have been designed around the gel card. This has required very elaborate, expensive, and slow robotic systems.

Specifically, complex robotics are required to move standard gel cards within automated IH systems. For example, if a particular test is ordered by the laboratory information system (LIS), the automated system must retrieve a specific gel card from an inventory deck and move it to the testing deck. This generally requires controlling a robotic gripper to find the specific gel card in the inventory deck and load it into a carrier, which is then moved to an elevator, which moves the carrier to the testing deck. A robotic gripper extracts the specific gel card, barcodes it, and pierces the appropriate microwell seals. At that point, the testing process, which also involves complex robotics, is initiated on the microwells of the gel card. To avoid waste, if some of the microwells of the gel card remain unused, the transportation process is reversed, such that the gel card with unused microwells is returned to the inventory deck.

In view of the above, what is needed is an alternative to the complex transportation robotics required by automated IH and other systems.

SUMMARY

Accordingly, systems, methods, and non-transitory computer-readable media are disclosed for providing and coordinating a plurality of conveyers within an automated system. In an embodiment, a system comprises a plurality of conveyors, wherein each of the plurality of conveyors comprises a plurality of segments configured to hold at least one item; one or more stations, wherein each of the one or more stations comprises one or more instruments; at least one hardware processor; and one or more software modules configured to, when executed by the at least one hardware processor, receive an instruction to perform an operation that requires at least one of the one or more stations to process at least a first item held by a first segment of a first one of the plurality of conveyors and a second item held by a second segment of a second one of the plurality of conveyors, in response to receiving the instruction, control one or both of the first conveyor and the second conveyor to move, such that the first segment and the second segment are aligned at the at least one station, and after the first segment and the second segment have been aligned at the at least one station, control the one or more instruments of the at least one station to process the first item and the second item. The at least one hardware processor may be configured to independently control each of the plurality of conveyors to move each of the plurality of conveyors independently from any of the other plurality of conveyors.

The plurality of conveyors may comprise a plurality of concentric circular carousel conveyor that rotate around a common point. The plurality of segments may be on a top surface of each of the plurality of concentric circular carousel conveyors, and the top surface of each of the plurality of concentric circular carousel conveyors may be within a same plane as the top surface of each of the other plurality of concentric circular carousel conveyors. Each of the plurality of concentric circular carousel conveyors may have a different radius, and in plan view, all but one of the plurality of concentric circular carousel conveyors may be nested within another one of the plurality of concentric circular carousel conveyors. Each of the plurality of conveyors may be configured to rotate in two directions, and the one or more software modules may be configured to, when executed by the at least one hardware processor: determine in which of the two directions to rotate at least one of the first conveyor and the second conveyor so as to minimize movement; and control the at least one of the first conveyor and the second conveyor to rotate in the determined direction. At least one of the plurality of concentric circular carousel conveyors may be configured to hold test cells for blood testing, and the one or more software modules may be configured to, when executed by the at least one hardware processor, control the at least one concentric circular carousel conveyor to spin as a centrifuge (e.g., spinning at 1,500 revolutions per minute or greater, or between 1,500 and 4,000 revolutions per minute). At least one of the plurality of concentric circular carousel conveyors may be configured to hold test cells for blood testing, and the one or more software modules may be configured to, when executed by the at least one hardware processor, control the at least one concentric circular carousel conveyor to spin so as to agitate the test cells held by the at least one concentric circular carousel conveyor. Each of the one or more stations may comprise a bridge extending, along a radial line of the plurality of concentric circular carousel conveyors, over each of the plurality of concentric circular carousel conveyors. The one or more instruments of the at least one station may comprise a pipettor configured to move along an underside of the bridge above the plurality of concentric circular carousel conveyors, and the one or more software modules may be configured to, when executed by the at least one processor, control the pipettor to move to any one of a plurality of positions above the plurality of concentric circular carousel conveyors.

The plurality of concentric circular carousel conveyors may comprise the first conveyor, the second conveyor, and a third conveyor, wherein the first conveyor is configured to hold test cells, the second conveyor is configured to hold reagent containers, and the third conveyor is configured to hold specimen containers, and wherein the one or more software modules are configured to, when executed by the at least one hardware processor: while the first conveyor and the second conveyor are aligned at the at least one station, control the pipettor to move over a reagent container on the second segment of the second conveyor, aspirate an amount of reagent from the reagent container on the second segment, move over a test cell on the first segment of the first conveyor, and dispense the amount of reagent into the test cell on the first segment; and, while the first conveyor and the third conveyor are aligned at the at least one station, control the pipettor to move over a specimen container on a third segment of the third conveyor, aspirate an amount of specimen from the specimen container, prepare a sample from the specimen, move over the test cell on the first segment, and dispense the sample into the test cell on the first segment. The first conveyor may be nested within the second conveyor, and the second conveyor may be nested within the third conveyor. One or more of the first conveyor, the second conveyor, or the third conveyor may comprise two or more concentric circular carousel conveyors that can rotate independently. Preparing a sample from the specimen may comprise: moving over a specimen-processing vessel; dispensing the amount of specimen into the specimen-processing vessel to be mixed with one or more fluids to form the sample; and aspirating an amount of the sample from the specimen-processing vessel. The one or more software modules may be configured to, when executed by the at least one hardware processor, control the pipettor to: move over a wash buffer containing wash fluid; aspirate wash fluid from the wash buffer to clean the pipettor; and, after cleaning the pipettor, dispense the wash fluid into a disposal buffer. Each test cell may comprise one or more L-shaped microwells, wherein each microwell comprises a receptacle portion and a well portion, wherein the well portion is configured to rest horizontally on a top surface of the first conveyor, and wherein the receptacle portion comprises an opening that is accessible to the pipettor while the well portion is resting horizontally on the top surface of the first conveyor. Each test cell may comprise a plurality of L-shaped microwells arranged in an annulus sector, which is attachable to and detachable from the top surface of the first conveyor, such that, when then annulus sector is attached to the top surface of the first conveyor, the plurality of L-shaped microwells longitudinally extend along a radial line of the plurality of concentric circular carousel conveyors, and wherein a peripheral curve of the annulus sector matches a peripheral curve of top surface of the first conveyor. The test cells may comprise an immunohematology or infectious-disease assay. The first conveyor may comprise a thermoelectric heating component that heats a top surface of the first conveyor on which the test cells are held so as to incubate the test cells, wherein the one or more software modules, when executed by the at least one processor, control the thermoelectric heating component to heat the top surface of the first conveyor for a determined amount of time.

One or more of the plurality of conveyors may comprise a thermoelectric cooling component that cools a top surface of the one or more conveyors on which items are held. Each of the plurality of conveyors may be configured to stop at each of a plurality of indexed positions. The one or more software modules may be configured to, when executed by the at least one hardware processor, move the plurality of conveyors to align any combination of segments, across the plurality of conveyors, at each of the one or more stations.

The one or more instruments of at least one of the one or more stations may comprise a reader device configured to read a characteristic of a third item on a segment of at least one of the plurality of conveyors. The reader device may comprise a camera configured to capture an image of a machine-readable indicia on the third item, and the one or more software modules may be configured to, when executed by the at least one hardware processor: identify the third item from the image; identify the segment of the at least one conveyor on which the third item is held; and map an identifier of the third item to an identifier of the identified segment. The identifier of the identified segment may comprise C-coordinates that uniquely identify a location on the at least one conveyor on which the third item is held, and the one or more software modules may be configured to, when executed by the at least one hardware processor, map the C-coordinates to G-coordinates that uniquely identify a location of the identified segment within an automated system. The third item may comprise a microwell, the reader device may comprise a camera configured to capture an image of the microwell, and the one or more software modules may be configured to, when executed by the at least one hardware processor analyze the image of the microwell to determine a test result. The camera may be configured to capture the image of the microwell while the microwell is spinning on the conveyor on which the microwell is held.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 5A-5C illustrate examples of test cells to be used on a carousel conveyor, according to an embodiment.

DETAILED DESCRIPTION

In an embodiment, systems and methods are disclosed for providing and using one or more coordinated conveyors within an automated system. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Overview of Conveyors

For ease of understanding, movement within the system will be described herein in terms of an X, Y, and Z coordinate system. With respect to figures providing a top-down view, the Z axis extends orthogonally through the page, whereas the X and Y axes are within the plane of the page and orthogonal to each other.

Figure 1:
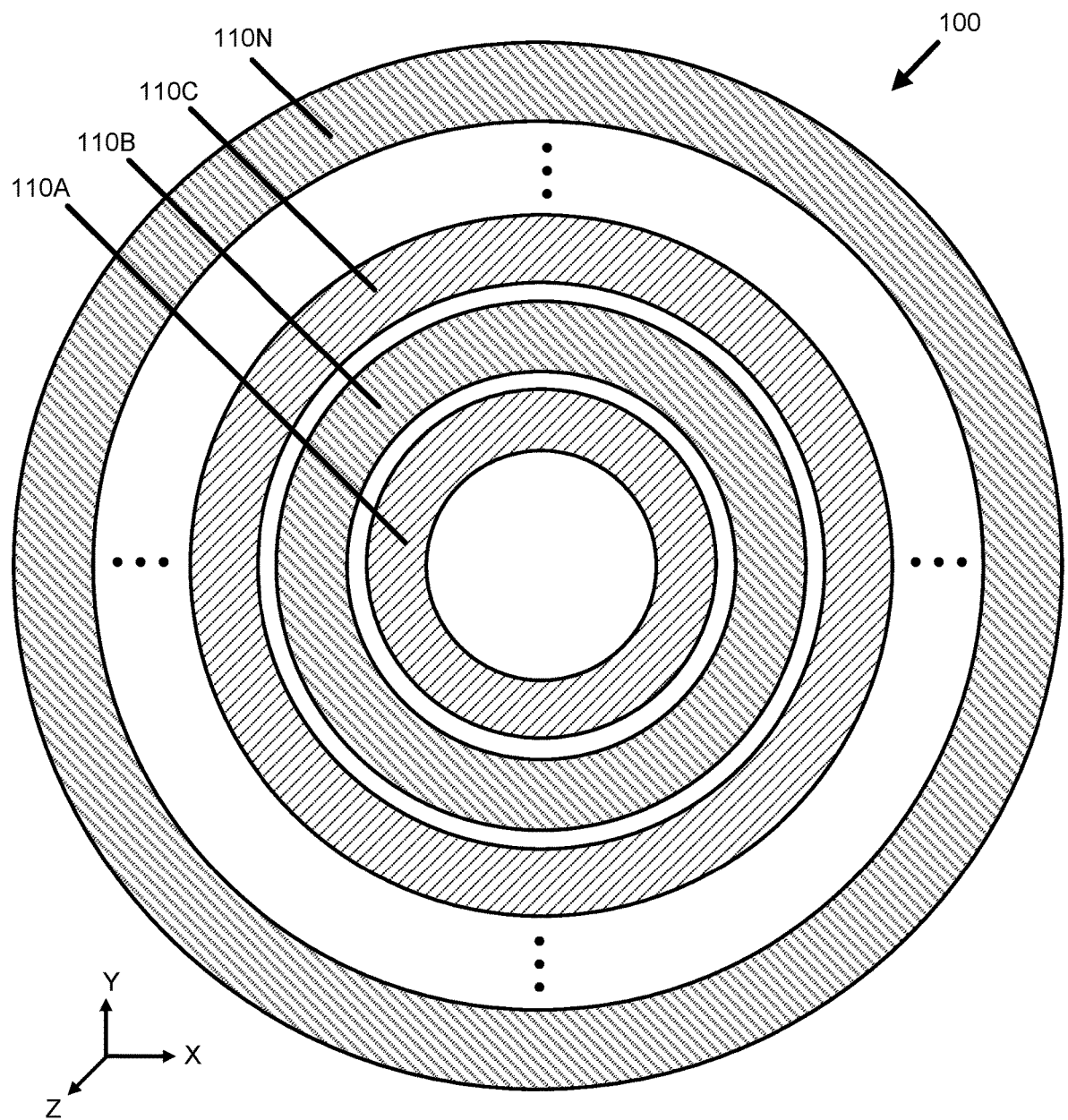
FIG. 1 is a top-down view of an exemplary system of conveyors, in which one or more of the processes described herein, may be implemented, according to embodiments.

FIG. 1 is a top-down view of an exemplary system of conveyors, according to an embodiment. In the illustrated embodiment, each conveyor 110 in system 100 is circular in plan view. However, one or more, including all, of conveyors 110 may instead be elliptical, linear, square, rectangular, or any other shape in plan view. In addition, one or more of conveyors 110 may be inclined, may rotate vertically instead of horizontally, may be positioned at an angle, and/or the like.

The plurality of conveyors 110 are illustrated as concentric to each other in plan view, with conveyor 110A nested within or surrounded by conveyor 110B, which in turn is nested within or surrounded by conveyor 110C, and so on and so forth. In an embodiment, the top surface of each conveyor 110 lies within the same X-Y plane as the top surface of every other conveyor 110. However, other configurations are possible. For example, the top surfaces of two or more, including all, of conveyors 110 may lie within different X-Y planes. In this case, two or more of conveyors 110, whose top surfaces lie in different planes, may overlap in plan view. In one embodiment, all of conveyors 110 may be of the same radius with their top surfaces lying in different X-Y planes that are all orthogonal to the Z axis. In other words, conveyors 110 may be stacked along the Z axis.

In the illustrated embodiment, conveyors 110 are spaced equidistantly apart from each other. However, in an alternative embodiment, the distances between conveyors 110 may vary within the X-Y plane and/or along the Z axis.

The number of conveyors 110 within system 100 will generally depend on how conveyors 110 are used within system 100. Thus, the number of conveyors 110 may be one, two, three, four, or any integer N, as illustrated in FIG. 1.

In the illustrated embodiment, in which circular conveyors 110 are used, conveyors 110 may be referred to as "carousels." Each carousel conveyor 110 rotates around the Z axis and, when concentric, rotates around the same point as every other carousel conveyor 110. In a preferred embodiment, each carousel conveyor 110 can rotate in both rotational directions (e.g., clockwise and counterclockwise in plan view).

In an embodiment, each conveyor 110 may be driven by its own motor, such as a stepper motor, Geneva drive, rack and pinion, or the like, under the control of a processing system described elsewhere herein. Each carousel conveyor 110 may comprise a carousel that rotates on a fixed circular base and is driven by a separate or on-board motor (e.g., on a circular track).

In an embodiment, each carousel conveyor 110 may rotate independently from any other carousel conveyor 110, in terms of direction and/or speed, and in parallel. For example, carousel conveyor 110A may rotate in one direction as carousel conveyor 110B rotates in the opposite direction or is stationary. Additionally or alternatively, carousel conveyor 110A may rotate at a different speed than carousel conveyor 110B.

The movement (e.g., rotation) of each conveyor 110 may be independently controlled by one or more processing devices described elsewhere herein. The processing device(s) may be programmed to coordinate movements of conveyors 110 to perform complex logistics in a wide variety of applications.

In an embodiment, one or more of carousel conveyors 110 may be configured to rotate with enough speed (e.g., radians per second) to serve as a centrifuge. For example, a centrifugal carousel conveyor 110 may be capable of spinning at greater than two-thousand revolutions per minute (RPM). In addition, the centrifugal carousel conveyor 110 may be able to move at much slower speeds when performing normal conveyance operations (e.g., to align a particular one of its segments with one or more segments on other conveyors 110). In other words, the centrifugal carousel conveyor 110 may be configured to act in either a normal mode or a centrifugal mode, as determined by a processing system.

Alternatively or additionally, one or more of conveyors 110 may be configured to act as an agitator. Agitation may comprise a carousel conveyor 110 rotating at a greater speed than during normal conveyance operations, but at a slower speed than a centrifuge. The agitation could also comprise a conveyor 110 alternating the direction of movement (e.g., direction of rotation for a carousel conveyor 110) in order to rock the items on the conveyor 110. In this case, the agitating conveyor 110 may accelerate in one direction, decelerate to a stop, accelerate in the opposite direction, decelerate to a stop, and so on and so forth. It should be understood that in the case of a carousel conveyor 110, the carousel conveyor 110 may function as both a centrifuge (at high RPM) and an agitator (at low RPM and/or with alternating rotational directions).

Each conveyor 110 may be configured to hold items of any size, shape, and type. In some implementations, the same conveyor 110 may be configured to hold items of different sizes, shapes, and/or types. However, in the primary embodiment discussed herein, each conveyor 110 holds items of the same size, shape, and type.

A conveyor 110 may be configured to move an item at a particular position on the conveyor 110 to a particular location associated with a station. In an embodiment, a conveyor 110 is configured to move an item at a particular position on the conveyor 110 to a location associated with any one of a plurality of stations. In either case, a station may comprise one or more instruments for performing some operation (e.g., collection, aspiration, deposition, imaging, detection, measurement, manipulation, assembly, grouping, packaging, etc.) on the item. A station may perform a single joint operation or simultaneous common operations on aligned items from multiple conveyors 110.

In an embodiment which utilizes multiple stations, each station may perform a same or different operation in parallel. For example, a first pipetting station (e.g., on one side of conveyance system 100) may prepare a test along a first radial line of conveyance system 100, while a second pipetting station (e.g., on the same or opposite side of conveyance system 100) simultaneously prepares a test along a second radial line of conveyance system 100. As another example, a pipetting station may prepare a test using one subset of conveyors 110, while a reading station may simultaneously read machine-readable indicia on items on the same subset or a different subset of conveyors 110. As yet another example, a plurality of reading stations may image test results in parallel, so that the data may interpreted or otherwise processed in parallel, to thereby increase throughput.

Items may be positioned on conveyors 110 or housed within conveyors 110 in any manner that is appropriate for the intended use of conveyance system 100. For example, items may rest on a top surface of a conveyor 110. Alternatively, items may be housed within individual drawers of a conveyor 110.

As discussed throughout, the movements of conveyors 110 may be coordinated under the control of a processing system. However, because conveyors 110 are independently controllable, each conveyor 110 may also be moved on its own in both directions. This enables random access of any portion on any conveyor 110, including any item or set of contiguous items that may be held by that portion. For example, in response to an instruction that identifies an item to be accessed (e.g., issued by another component or system, an operator via a graphical user interface, etc.), the processing system may determine the location of the item on a conveyor 110 (e.g., by mapping an identifier of the item to a place identifier discussed elsewhere herein), and move the conveyor 110 so that the location of the item is accessible (e.g., at an access panel of the automated system, by a robotic pushing or gripping system, etc.). As another example, in response to an instruction that identifies a portion (e.g., segment) of a conveyor 110 to be accessed (e.g., issued by another component or system, an operator via a graphical user interface, etc.), the processing system may determine the location of the portion of the conveyor 110, and move the conveyor 110 so that the location of the portion is accessible (e.g., at an access panel of the automated system, by a robotic pushing or gripping system, etc.). In this manner, an item can be stowed on or removed from the accessible portion of conveyor 110.

It should be understood that conveyance system 100 may be made compatible with any external systems. Examples of such external systems including, without limitation, LIS, remote operating systems, dashboard systems, quality control systems, alarm systems, inventory management systems (e.g., which manage specimens and/or reagents, and may perform automatic reordering), and/or the like.

1.2. Example Processing Device

Figure 2:
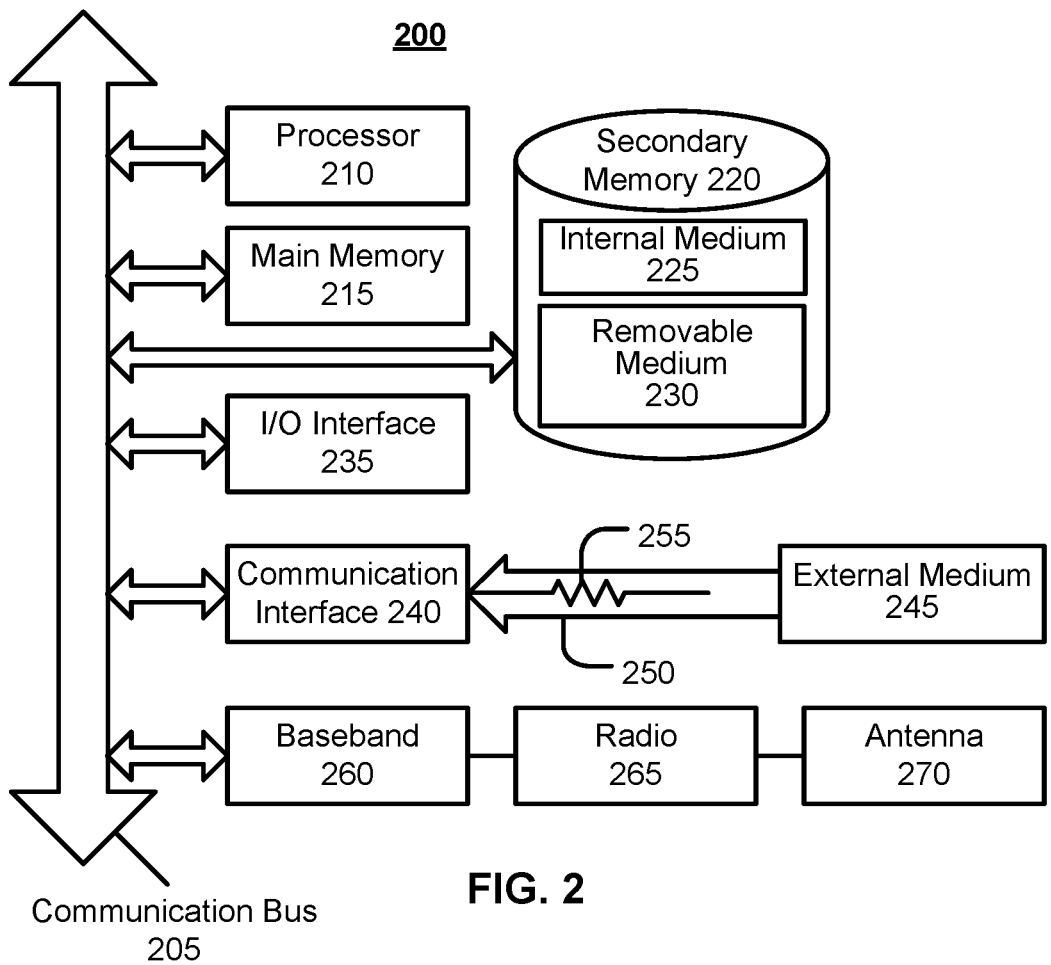
FIG. 2 illustrates an example processing system, by which one or more of the processed described herein, may be executed, according to an embodiment.

FIG. 2 is a block diagram illustrating an example processing system 200 that may be used in connection with various embodiments described herein. For example, processing system 200 may be used as or in conjunction with one or more of the functions, processes, or methods described herein, to control conveyors 110 and/or stations within conveyance system 100, analyze and/or report test results in an automated IH system, and/or the like. System 200 can be a server, conventional personal computer, or any other processor-enabled device. Other computer systems and/or architectures may be also used, as will be clear to those skilled in the art.

In an embodiment, system 200 controls one or more motors that drive conveyors 110. For example, system 200 may drive an actuator of a motor to activate and deactivate the motor, change the direction of rotation of the motor, change the speed of the motor, and/or the like. An automated system, comprising conveyance system 100, may comprise a separate system 200 for each conveyor 110 and/or a single system 200 that controls two or more, including potentially all, of conveyors 110.

In addition, system 200 may communicate with one or more stations to control the stations and/or receive, analyze, and/or report data sensed by the stations. For example, system 200 may send instructions that control one or more instruments (e.g., pipettor, camera, NFC chip, radio frequency identification (RFID) interrogator, or other sensor, etc.) of a station to the station. System 200 may also receive data (e.g., image data, signal data, etc.) collected by one or more instruments of a station. This received data may be analyzed, interpreted, or otherwise processed by system 200 for reporting purposes.

System 200 may also communicate with a LIS or other system that is external to the automated system. System 200 may communicate with this external system, for example, via an application programming interface (API) and/or over at least one network. System 200 may receive instructions from the external system (e.g., from the LIS to run one or more tests on one or more specimens), and report test results to the external system.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7@ processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, including one or more software modules) is stored in main memory 215 and/or secondary memory 220. Computer programs can also be received via communication interface 240 and stored in main memory 215 and/or secondary memory 220. Such computer programs, when executed, enable system 200 to perform the various processes and functions described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, comprising one or more software modules, etc.) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various processes and functions of the disclosed embodiments.

1.3. Example Conveyor System

Figure 3A:
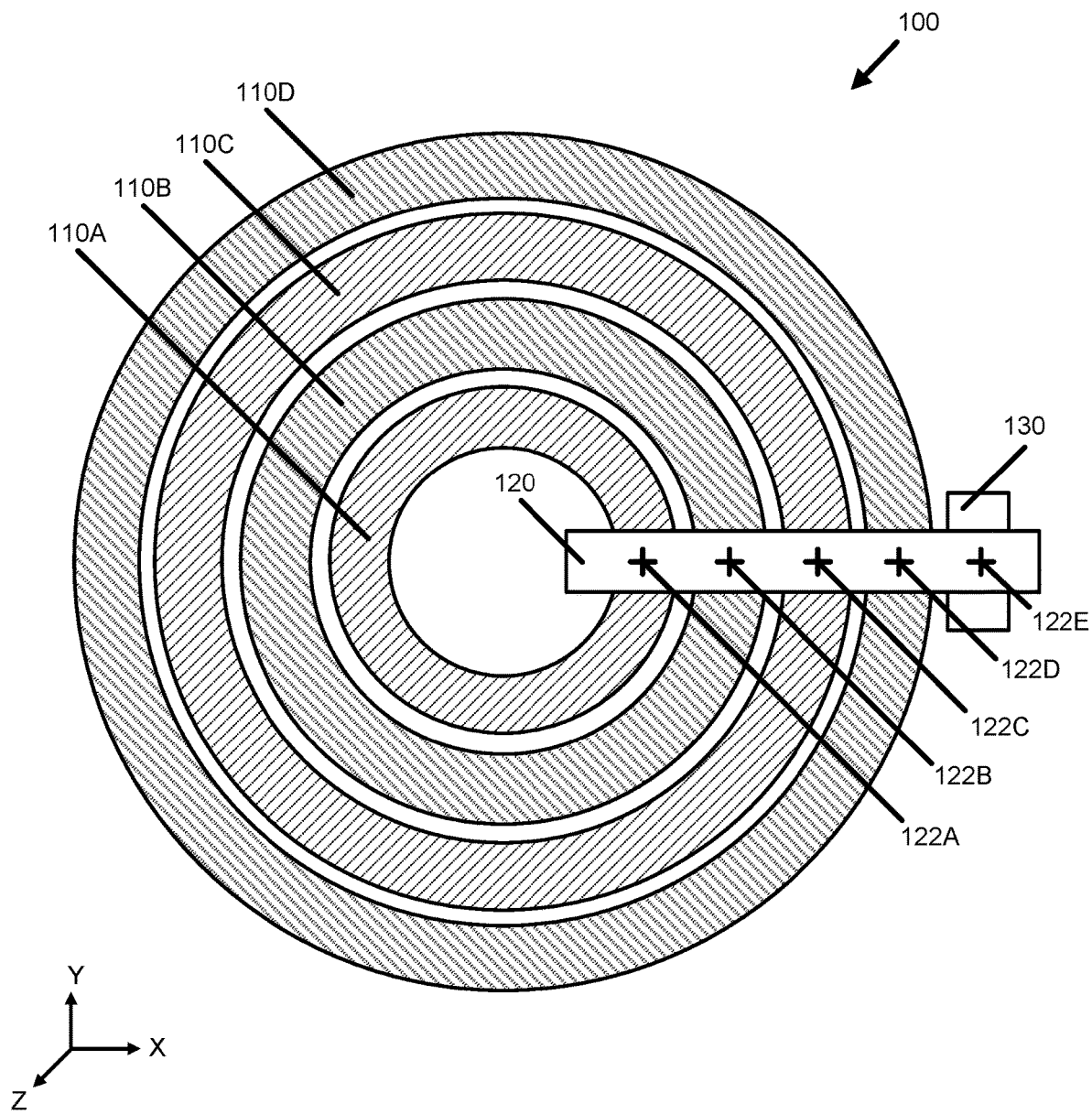
FIGS. 3A and 3B illustrate top-down and side cross-sectional views, respectively, of an exemplary system of conveyors, according to an embodiment.
Figure 3B:
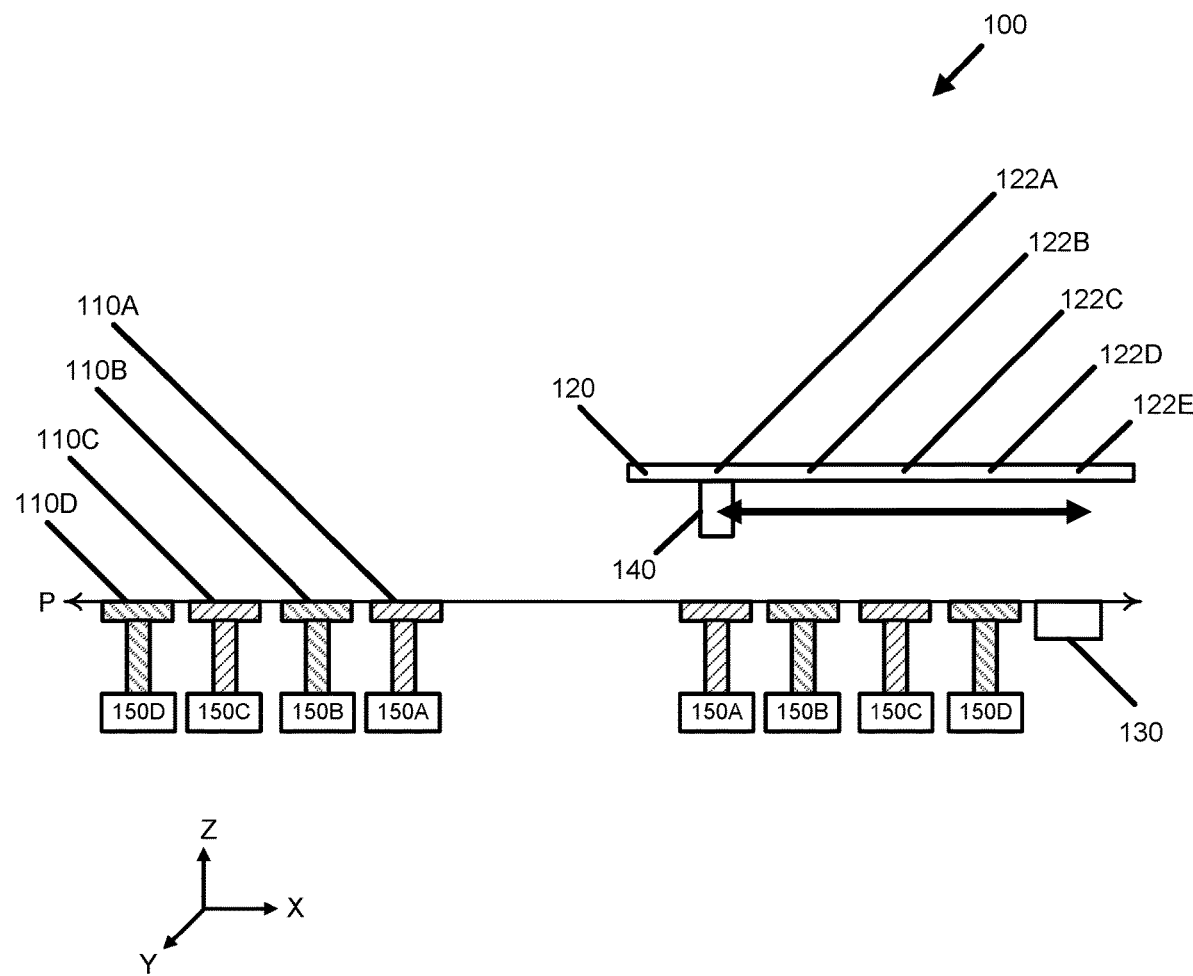

FIG. 3A is a top-down view and FIG. 3B is a side cross-sectional view of an exemplary system of conveyors, according to an embodiment. This embodiment of conveyance system 100 may be used, for example, within an automated blood-testing system. For the purposes of illustration, conveyance system 100 will be described primarily in the context of pre-transfusion blood testing of donor blood (e.g., serological disease-screening tests for hepatitis, HIV, etc.). However, this example is not limiting, and it will be readily apparent to a person of skill in the art how to adapt the described embodiments to other blood-testing—and more generally, chemical-testing—processes (e.g., coagulation studies, chemistries, serum enzymes, prothrombin time (PT) tests, partial thromboplastin time (PTT) tests, etc.).

In the illustrated example, conveyance system 100 comprises four concentric circular carousel conveyors 110A, 110B, 110C, and 110D, whose top surfaces are all in the same X-Y plane, and which are all configured to rotate around the Z axis, independently of each other, under the control of one or more processing systems 200. It should be understood that the number of concentric circular carousel conveyors 110 may be decreased or increased to any number, and that four is simply used as one non-limiting example.

As illustrated in FIG. 3B, each of carousel conveyors 110A, 110B, 110C, and 110D may be independently driven by drives 150A, 150B, 150C, and 150D, respectively. Each drive 150 may comprise a motor (e.g., stepper motor, Geneva drive, rack and pinion, etc.) that rotates the respective carousel conveyor 110 on a circular track. For example, the motor may rotate a belt that frictionally grips a circumference of a portion of the respective carousel conveyor 110 to impart rotation to the carousel conveyor 110. The motor may be configured to rotate at a plurality of different speeds and/or in two different directions.

In an embodiment, conveyance system 100 comprises one or more bridges 120 positioned along a radial line that extends outward from the center of carousel conveyors 110. Bridge 120 is one example of a station discussed elsewhere herein. The station may also comprise an apparatus 130 for performing certain bridge-related operations external to conveyors 110 (e.g., cleaning a pipettor tip).

Each bridge 120 may be stationary, but, in an alternative embodiment, could be configured to move. In an embodiment, each bridge 120 comprises one or more instruments 140 on its underside, between bridge 120 and conveyors 110. Instrument(s) 140 may be movable between two or more, including potentially all, of positions 122A-122E. For example, instrument 140 may be configured to slide along the underside of bridge 120 between any of positions 122A-122E. Alternatively, instrument(s) 140 may be permanently fixed at one or more, including potentially all, of positions 122A-122E. In either case, there may be a plurality of bridges 120, each positioned along a different radial line that extends outward from the center of carousel conveyors 110. Each of the plurality of bridges 120 may comprise the same or different configurations of one or more movable and/or fixed instruments 140.

Instrument(s) 140 may comprise one or more sensors. The sensor(s) may comprise a camera capable of imaging in the visible light spectrum, the infrared light spectrum, the ultraviolet light spectrum, and/or the like. Additionally or alternatively, the sensor(s) may comprise any other type of reading or detection device that is configured to image, measure, recognize, characterize, or otherwise sense some feature of an item on a conveyor 110 beneath the device.

In an embodiment that utilizes a camera as instrument(s) 140, the camera may be configured to observe multiple items (e.g., test cells) simultaneously. This may be implemented using depth-of-field software and/or zoom parameters (e.g., up to microscopic resolution), such that a sufficient number of pixels, as required by analysis software (e.g., image processing algorithms), are available for each target (e.g., hemagglutinating red-blood cells) in the image data to be recognized. The camera may be configured to record continuous video (e.g., image frames) or multiple still images, for example, of test cells, to be used for interpreting test results. The camera may record the video or still images from above or below the items being imaged. As an example, one or more of the cameras may be stationary dual-lens megapixel cameras that employ onboard or remote image recognition and/or classification (e.g., via artificial intelligence using neural networks, etc.), electronic or optical zooming, depth-of-field technology, and/or the like. Notably, the imaging can be performed without moving any items off of conveyors 110.

Alternatively or additionally, instrument(s) 140 may comprise a pipettor, which is capable of sliding along the underside of bridge 120 between any of positions 122A-122E. The pipettor may be oriented so that its tip faces conveyors 110 and may be configured to raise (i.e., move towards bridge 120 to increase the distance between the pipettor tip and conveyors 110) and lower (i.e., move towards conveyors 110 to decrease the distance between the pipettor tip and conveyors 110).

In an embodiment, each conveyor 110 may be divided into segments. For example, carousel conveyors 110 may be logically segmented into wedges (e.g., annulus sectors, circular arc segments, crescents, etc.). Similarly, linear conveyors 110 may be divided into rectangles. Each conveyor 110 may be configured so that, when the conveyor 110 stops, a center of each segment must be aligned with one of a plurality of indexed positions. In other words, when a conveyor 110 is stationary, the center of every segment must be at an indexed position, and cannot be between indexed positions. Thus, if processing system 200 stops a conveyor 110 before its segment centers are aligned with the indexed positions, conveyor 110 may continue to move the minimum amount necessary for its segment centers to align with the indexed positions prior to stopping. In the case of a carousel conveyor 110, the carousel conveyor 110 would only be able to move by a multiple of a fixed radian amount, and in the case of a linear conveyor 110, the linear conveyor 110 would only be able to move by a multiple of a fixed distance.

The centers of the segments, as well as the indexed positions, may be equidistantly spaced, and the number of segments may equal the number of indexed positions in a given conveyor 110. In an embodiment, the indexed positions represent a position of the respective conveyor 110 at which at least one of the segments is properly accessible by an instrument 140 (e.g., on bridge 120). Each conveyor 110 may have the same number of indexed positions as every other conveyor 110 or a different number of indexed positions than one or more other conveyors 110. Similarly, each conveyor 110 may be divided into the same number of segments as every other conveyor 110 or a different number of segments than one or more other conveyors 110, depending on the intended usage. In an alternative embodiment, indexed positions may be omitted. In such an embodiment, processing system 200 may control each conveyor 110 to move to any position and by any rotational or linear distance.

Advantageously, since the automated or robotic movements in conveyance system 100 are short and direct and implemented by the same mechanism (e.g., indexing and spinning of carousel conveyors 110), the automated system may utilize a minimalist and inexpensive design. For example, all movements of conveyor 110 may be performed by the same, easily controllable mechanisms (e.g., drive 150, which may comprise a stepper motor, Geneva drive, rack and pinion, etc.), and are direct, one-dimensional, quick, and short (e.g., a fraction of a centimeter). This can remove 90% of the robotic mechanisms employed by current, expensive systems, while increasing throughput rate.

In an embodiment, each segment of a conveyor 110 may be individually movable. For example, each segment may be configured to be shunted out of its respective conveyor 110 (e.g., vertically, horizontally, etc.). When a segment has been shunted out of its respective conveyor 110, other segments of the conveyor 110 may be configured to move into or through the shunted segment's position within conveyor 110, and then the shunted segment may be moved back into conveyor 110. This enables segments to pass each other within conveyor 110.

In addition, in an embodiment, when two segments of two adjacent conveyors 110 are aligned, an item on one segment of one conveyor 110 may be pushed or otherwise transferred to the adjacent segment on the other conveyor 110. This transfer may be implemented by a robotic pusher that is configured to extend across the segment holding the item to push the item across to the adjacent segment and then retract, or a robotic gripper that is configured to grip the item and pull it across to the adjacent segment. In such an embodiment, the adjacent conveyors 110 may be substantially flush with each other such that there is no spacing or little spacing between the adjacent conveyors 110.

In an embodiment, one or more of conveyors 110 may be temperature-controlled. In such an embodiment, the surface temperature of segments of the conveyor 110 or the entire conveyor 110 may be controlled using, for example, thermoelectric heating and/or cooling. Different segments of the same conveyor 110 may be individually controlled, for example, to be different temperatures than each other. Alternatively or additionally, portions of the encompassing automated system may be temperature-controlled. In such an embodiment, processing system 200 may move one or more segments of one or more conveyors 110 into these temperature-controlled portions, to control the temperature of items being held by those segments. In either case, the temperature of the temperature-controlled conveyors 110 or temperature-controlled portions of the automated system may be adjusted under control of processing system 200.

1.4. Place Identification

In an embodiment, each item within the automated system is associated with a place identification (PID). Each PID may comprise a set of one or more coordinates that identify a position of an item within the automated system. In some cases, the PID may be the sole identifier of items within conveyance system 100. In an embodiment, the PID comprises both a C-coordinate and a G-coordinate.

Each C-coordinate may identify a fixed location on a conveyor 110 or other holding component of the automated system, such as a fixed storage shelf from which items are moved to a conveyor 110 and/or to which items are moved from a conveyor 110. The C-coordinate may comprise coordinates (e.g., Cartesian X-Y coordinates in two-dimensional Euclidean space) about a fixed origin point on the holding component's surface (e.g., the top surface of a conveyor 110). For instance, as discussed above, each conveyor 110 may be divided into a plurality of segments. Each of these plurality of segments for each conveyor 110 may be permanently associated with a unique C-coordinate that uniquely identifies the segment's position within the holding components of the automated system. As long as an item is positioned on a particular holding component (e.g., a particular segment of conveyor 110), there is no need to continue tracking the item via reading methods (e.g., barcode readers), since the location of the item may be fixed at its associated C-coordinate (e.g., the C-coordinate of the particular segment of conveyor 110 on which it is being held) for the duration of its processing. Thus, advantageously, since items are processed in place, once an item's position has been identified once (e.g., by reading its associated barcode or other machine-readable indicia at a particular C-coordinate), it does not need to be identified again.

As mentioned above, each C-coordinate may comprise X and Y coordinates, representing a unique position on a conveyor 110. With respect to a circular carousel conveyor 110, the X axis may be defined as coextensive with the circular profile of conveyor 110, and the Y axis may be defined as a radial line extending outward from the center of the circular profile of conveyor 110. Thus, each item on carousel conveyor 110 may be assigned an X coordinate that identifies the item's location on the circular X axis of carousel conveyor 110, and a Y coordinate that identifies the item's position on a radial line extending through the X coordinate.

A separate C-coordinate system may be utilized for each conveyor 100 or other holding component in the automated system. In such an embodiment with N−1 holding components (e.g., including conveyors 110), the PID could be N-dimensional. Specifically, the PID could comprise a G-coordinate, plus a C-coordinate for each of the N−1 holding components. However, in this case, only one C-coordinate would ever be valid at a time (the others can be null), since an item can only be held by one holding component at a time, and therefore, have only one C-coordinate at a time. Alternatively, all of the holding components could be defined in a single, shared Euclidean space, especially in the case in which the top surfaces of all of the holding components are within the same plane (e.g., in an embodiment with concentric circular carousel conveyors 110). In such an embodiment, the value of the C-coordinate itself will identify on which holding component an item is being held.

Each G-coordinate may comprise real-world Global Positioning System (GPS) coordinates (e.g., latitude and longitude, and optionally elevation) or similar coordinates defined for a particular space (e.g., housing of the automated system, manufacturing floor, etc.). The Euclidean space of the C-coordinate system may be superimposed on an underlying ground Euclidean space of the G-coordinate system (e.g., underlying conveyors 110 and other holding components of the automated system). Both Euclidean spaces may have the exact same dimensions, and the Euclidean space of the C-coordinate system may directly relate to the ground Euclidean space of the G-coordinate system about a fixed origin point on the ground Euclidean space beneath conveyors 110.

In an embodiment, the C-coordinate and G-coordinate systems may be polar coordinate systems around a fixed center pole. This may be especially convenient in embodiments which utilize circular carousel conveyors 110. In a polar coordinate system, each point on a plane is determined by a distance from a reference point and an angle from a reference direction. Thus, each location in the polar coordinate system is a vector, which enables application of any equation in matrix algebra.

As discussed above, C-coordinates of items on moving surfaces, such as the top surfaces of conveyors 110, may move over time. However, because of the relationship between the C-coordinate system and the G-coordinate system, points in the C-coordinate system may be tied to fixed points in the G-coordinate system. Thus, a full PID may be defined as the combination of a C-coordinate, which identifies a location on a holding component of the automated system, and a G-coordinate, which identifies a location within the automated system.

In this manner, an item can be associated with a PID so that its exact location throughout the automated system can be tracked by processing system 200. In other words, the exact location of an item within an automated system can be identified using its assigned PID. Processing system 200 tracks the PIDs of all items within the automated system at all times, and may control their movements without human intervention. For instance, processing system 200 may control conveyors 110 and/or other devices (e.g., a robotic gripper) to fetch an item or set of items from a source PID (e.g., a shelf), move it onto a conveyor 110, convey the item(s) on the conveyor 110 (during which time the PID may be continually updated to reflect its changing G-coordinate, while its C-coordinate remains fixed), and deliver the item (s) of the conveyor 110 to a destination PID (e.g., another shelf). The movement of items between holding components (e.g., conveyors 110, shelves, etc.) may be observed by cameras, which may be monitored and/or controlled by artificial intelligence (AI).

In an embodiment, processing system 200 may utilize an optical or mechanical system to continually determine the G-coordinate of a given C-coordinate based on the relationship of the fixed origin point of the C-coordinate system to the G-coordinate system. In other words, processing system 200 can determine the exact position of a conveyor 110—and therefore, items on the conveyor 110—at any given moment. Accordingly, processing system 200 may calculate the G-coordinate of any item on a conveyor 110, regardless of whether conveyor 110 is stopped or in motion. This enables processing system 200 to control the G-coordinate of any item, for example, by moving the item from one G-coordinate to another G-coordinate using one or more conveyors 110.

Relational databases may be used to track items via their PIDs. Specifically, each item may be associated in a relational database with a PID. The PID may be used as an index or key into the relational database of items. The items may be associated with other data as well, such as an item identifier, one or more item descriptors (e.g., type, price, etc.), and/or the like. A relational database may persistently record every movement of an item. For example, a row may be stored in a movement table that identifies the item that was moved, the PID of the source of the movement, the PID of the destination of the movement, the time of the movement, and/or the like. This history of movements can be used for a variety of applications, including auditing, debugging, calculating royalties for use of conveyance system 100, and/or the like.

As mentioned elsewhere herein, in an embodiment, conveyance system 100 enables random access of any item or set of contiguous items or segment on any conveyor 110. For example, each segment may be individually addressed by PID. Processing system 200 may receive an instruction for random access to an item or segment. The instruction may comprise an identifier of the item and/or the C-coordinate or full PID of the segment, and may be received from another component of the automated system, from an external system, from an operator via a graphical user interface of the automated system, and/or the like. If the instruction comprises an identifier of the item, processing system 200 may map the identifier to a C-coordinate or full PID that identifies the segment and conveyor 110 on which the item is located. Otherwise, if the instruction comprises the C-coordinate or full PID, this C-coordinate or PID readily identifies the segment and conveyor 110 to be randomly accessed to processing system 200. In either case, once the segment has been identified, processing system 200 may then control the conveyor 110, comprising the segment, to move the segment into a position in which it may be accessed. For example, the access position may be a position that is accessible through an opening for loading and unloading of items, a position that is accessible to another robotic system (e.g., pusher or gripper), and/or the like.

In this manner, any segment and/or item within conveyance system 100 can be randomly accessed. This ability to randomly access segments allows an item to be quickly unloaded from or loaded onto any segment of any conveyor 110, and enables high-volume items (e.g., frequently used items) to be stowed on conveyors 110 near each other. It can also facilitate the archiving of unexpired samples (e.g., at a blood bank). For example, a tested sample may be stowed on a conveyor 110, and then subsequently tested again (e.g., a few days later) for ongoing transfusions, in so-called "reflex" testing (i.e., tests indicated by events or new results). In addition, processing system 200 may utilize random access of segments of conveyors 110 to automatically re-sort items on conveyors 110, for example, to optimize placement of those items within the automated system.

1.5. Example Coordination of Carousels

Figure 4A:
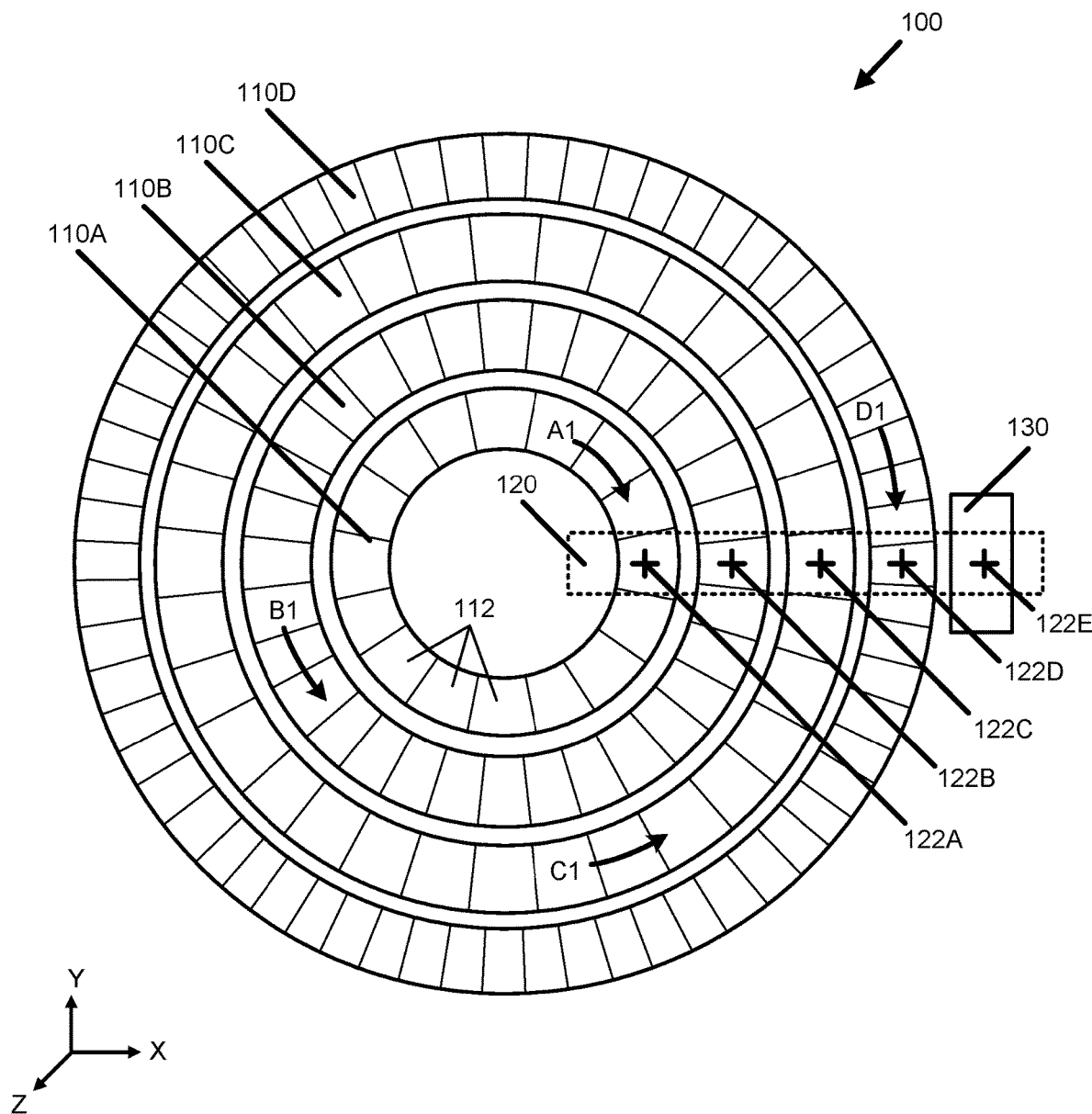
FIGS. 4A and 4B illustrate an example of how the movements of conveyors may be coordinated, according to an embodiment.
Figure 4B:
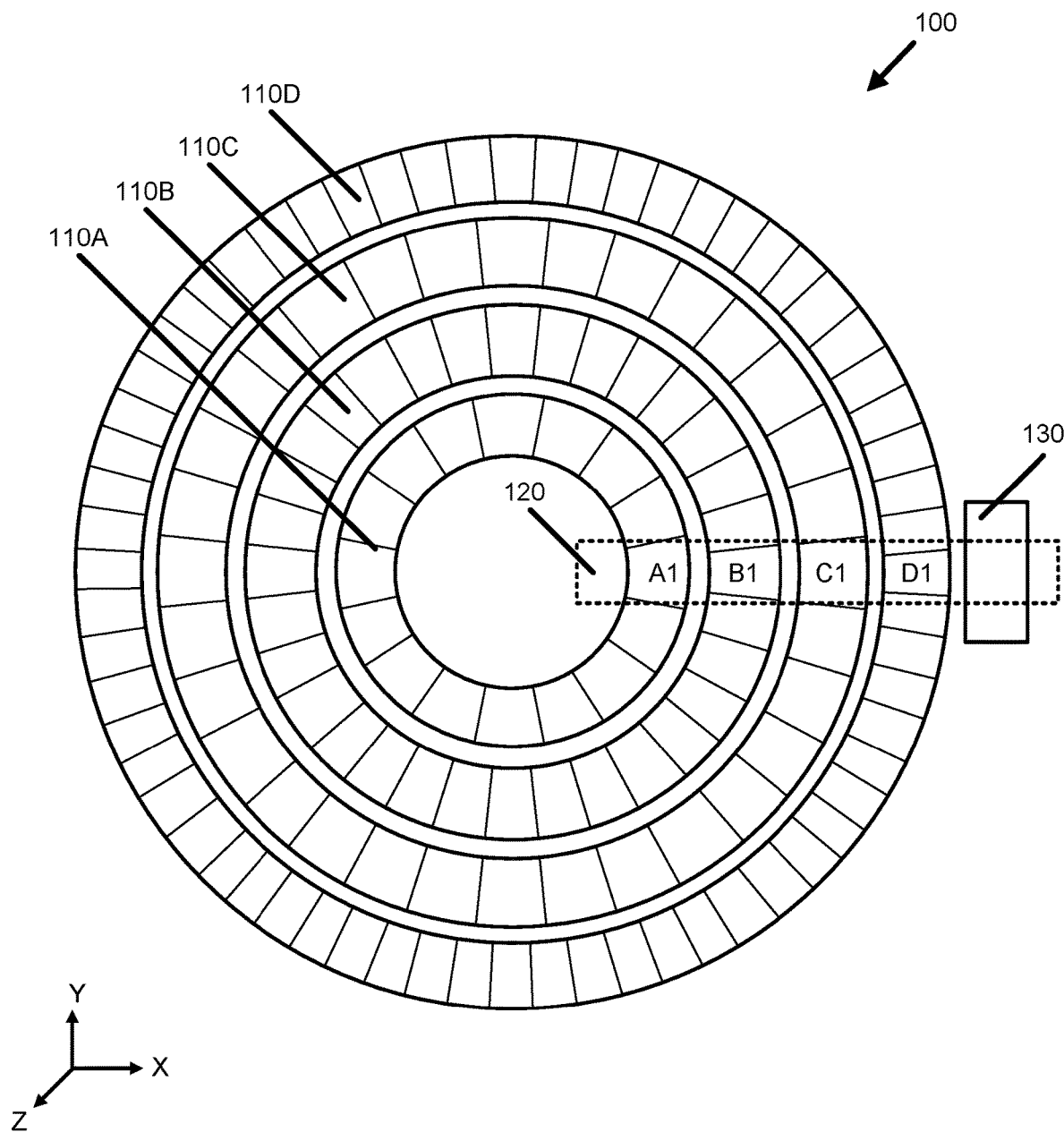

FIGS. 4A and 4B illustrate an example of how the movements of conveyors 110 may be coordinated, according to an embodiment. The illustrated conveyance system 100 comprises four carousel conveyors 110A. Each carousel conveyor 110 is divided into wedges 112, for example, with each wedge 112 being represented by a different PID.

In the illustrated example, processing system 100 determines that it must align the wedges 112, that have been assigned C-coordinates A1, B1, C1, and D1, into a radial line underneath bridge 120, so that they may all be accessed for an operation using one or more instruments on bridge 120. As shown in FIGS. 4A and 4B, A1 on conveyor 110A is rotated clockwise by three indexed positions, B1 on conveyor 110B is rotated counterclockwise by fifteen indexed positions, C1 on conveyor 110C is rotated counterclockwise by seven indexed positions, and D1 on conveyor 110D is rotated clockwise by four indexed positions, to align A1, B1, C1, and D1, on carousels 110A-110D, in the same radial line under bridge 120. Consequently, A1 is under position 122A of bridge 120, B1 is under position 122B of bridge 120, C1 is under position 122C of bridge 120, and D1 is under position 122D of bridge 120. Accordingly, all of the wedges 122, identified by A1, B1, C1, and D1, are accessible by the instrument(s) of bridge 120, as shown in FIG. 4B.

In the example of FIGS. 4A and 4B, carousel conveyors 110 are capable of rotating in either direction. Thus, processing system 200 may select a direction of rotation for each of conveyors 110 that is most efficient for that particular conveyor 110. Efficiency may be defined as the least amount of movement, in which case processing system 200 may select a direction of rotation that requires the least amount of rotation to move a particular wedge 112 to its destination indexed position. However, in an alternative system 100, carousel conveyors 110 may only rotate in a single direction, or a different definition of efficiency may be used.

Notably, conveyors 110 may be controlled to align any combination of segments 112, across conveyors 110, in a radial line with each other (e.g., under bridge 120). Thus, processing system 200 may coordinate conveyors 110 to align segments 112, thereby aligning the particular items being held on those segments 112, in order to execute a particular task on the aligned items (e.g., using instrument(s) 140 on bridge 120). In this case, each conveyor 110 may convey a set of items that are all related to the same step in an overall task, such that, when segments 112 are aligned, all of the items needed for all of the steps of the task are available on a radial line across conveyors 110. For example, referring to FIG. 4B, an item for a first step of the task may be located at A1 and accessible at position 122A to an instrument 140, an item for a second step of the task may be located at B1 and accessible at position 122B to an instrument 140, and item for a third step of the task may be located at C1 and accessible at position 122C to an instrument 140, and an item for a fourth step of the task may be located at D1 and accessible at position 122D to an instrument 140. Using larger numbers of segments, millions or billions of different combinations of items can be quickly radially aligned serially or in parallel.

1.6. Immunohematology

In an embodiment, the conveyance system 100 in FIG. 3, comprising four concentric carousel conveyors 110, may be configured to perform pre-transfusion blood testing (e.g., for viral and other infectious disease markers). While the concentric carousel conveyors 110A-110D are shown and described below in a particular order from the center to outside of conveyance system 100, carousel conveyors 110A-110D may be provided in a different order. Furthermore, conveyance system 100 may comprise fewer or more concentric carousel conveyors 110 than shown.

A first carousel conveyor 110A may hold test cells (e.g., 100 to 10,000 test cells) of various shapes and sizes, as required by the particular tests to be performed. The test cells may comprise an assay, such as an IH assay (e.g., for red-blood cell antigens and antibodies), an infectious disease assay, or an assay for other clinical diagnostic tests. The test cells may comprise clip-on racks (e.g., crescent-shaped racks), which may, but do not have to, fill the entire top surface of first carousel conveyor 110A. Each rack may comprise concentric curved lines of test cells. The racks of test cells may clip on and off first carousel conveyor 110A and be disposable.

The tests cells may comprise IH or infectious-disease assays. Such assays may be forward-typing, reverse-typing, Rh-typing, antibody-screening, antibody-identifying, red-blood-cell-phenotyping, AHG-testing, viral-marking, and/or the like. Viral-marking antigens may comprise CMV, HBV (surface antigen and core anitbody), HCV, HIV (type 1 and 2), HTLV, Chagas disease, Zika virus, and West Nile virus.

In an embodiment, the test cells for pre-transfusion blood testing may comprise one or more fluid zones. The top fluid zone may be for incubating plasma and/or serum and red-blood cells.

FIGS. 5A-5C illustrate examples of test cells to be used on a carousel conveyor 110, according to an embodiment. Conventional gel cards have a plurality (e.g., six or eight) of vertical microwells. In contrast, FIG. 5A illustrates a horizontal microwell, according to an embodiment. Microwell 500 comprises a receptacle portion 510 (e.g., where plasma and red blood cells can incubate), with an opening or access port for receiving a pipette tip, connected to a horizontal well portion 520. Each microwell 500 may be an L-shaped lateral flow assay that lies horizontally and radially, with the access port facing up to receive fluids from above. This enables the microwell 500 to be centrifuged in place and read from above or below. Each microwell 500 may be 25 millimeters (mm) long, and may sit substantially flush on the top surface of first carousel conveyor 110A.

As illustrated in FIG. 5B, these microwells 500 may be arranged in a line 550 (e.g., of six, eight, or ten microwells 500 each). In IH, it is routine to run a panel of ten tests on a sample, requiring pipetting red-blood cells into five microwells and plasma into five microwells. Thus, in a preferred embodiment, each line 550 may comprise ten microwells 500.

Furthermore, as illustrated in FIG. 5C, these lines 550 of microwells may be combined into racks 560 (e.g., of six, eight, or ten lines 550 each) and held (e.g., clipped on) the top surface of a carousel conveyor 110. Racks 560 may be arranged on the top surface of a carousel conveyor 110 with the opening of receptacle portion 510 on each microwell 500 facing upward. Notably, each line 550 of microwells 500 may correspond to a radial line extending outward from conveyance system 100. In addition, each microwell 500 may be arranged such that its receptable portion 510 is closer to the inner edge of carousel conveyor 110, while its well portion 520 is closer to the outer edge of carousel conveyor 110, to thereby enable lateral centrifugation. Racks 560 may be arranged, and angled with respect to each other, in annulus sectors, to substantially cover the entire top surface of carousel conveyor 110. As an example, each annulus sector on first carousel conveyor 110A may be 100 centimeters (cm) long and 25 cm wide, and hold 300 test cells in each of 10 concentric perimeter rings, providing up to 3,000 available disposable test cells per annulus sector. As another example, each annulus-sector-shaped rack 560 may comprise one-hundred radial lines 550 with ten microwells 500 in each line 550, providing 1,000 available test cells per annulus sector.

As used racks 560 are removed from first carousel conveyor 110A, new, clean, disposable racks 560 may be placed on first carousel conveyor 110A in their places. The removal and/or placement of racks 560 may be performed manually or automatically. As tests are scheduled by the automated IH system, racks 560 may be prepared with sufficient lead time to perform the scheduled tests, for example, by adding reagents to the number of microwells 500 that will be used during the tests. Alternatively, racks 560 may be manufactured with reagents in place. Advantageously, the capability of onboard, in-place preparation of microwells 500 provides greater flexibility in test menus, lowers the cost of disposables, eliminates the problem of wasted wells, enables simpler and less expensive manufacturing of test cells, with simpler shipping and quality control processes and fewer recalls, and simpler inventory management.

The illustrated configuration of microwells 500 enables first carousel conveyor 110A to be effectively used as a centrifuge on microwells 500. This is advantageous, since the microwells 500 do not need to be moved to a separate centrifuge device. In other words, they can be both tested and centrifuged, in the same place, on carousel conveyor 110A, eliminating the need for complex robotics to move the test cells into and out of a separate centrifuge. Carousel conveyors 110 may be configured to spin at one or more centrifugal speeds, as required for the specific test being performed (e.g., apheresis for CAT testing). For example, to run gel tests, antibody and red-blood cells may be added to a microwell 500 on carousel conveyor 110A, and then carousel conveyor 110A may be spun at a set speed for a set time to deliver a measured amount of centrifugal force that moves agglutinated or non-agglutinated red-blood cells toward the closed end of well portion 520. Test results can be read out by a camera or other reader device that is positioned above or below the well portion 520 of the microwell 500 (e.g., at position 122A on a bridge 120). Advantageously, the same standard, established, validated, FDA-approved CAT tests (e.g., protein flotation or simwash method for red-blood cell washing) can be performed, without modification or development, in this improved manner. It should be understood that not all testing may require centrifugation (e.g., homogenous "passive" IH testing). In these cases, first carousel conveyor 110A is simply not used in its centrifugation mode.

In the manner described above, hundreds or thousands of fresh microwells 500 (e.g., for CAT testing) can be positioned and immediately accessible for testing (e.g., on a testing deck of an automated IH system), providing a simpler, faster, and less expensive way to automate CAT testing. Advantageously, microwells 500 start in place and stay in place during the entire testing process. Instead of conventional six- to eight-well vertical gel cards, which have to be tilted to horizontal in bucket centrifuges, embodiments of the disclosed microwells 500 can be spun in place in large numbers. In other words, first carousel conveyor 110A can rotate to indexed positions for loading, reading, and pipetting, remain stationary for incubation, and spin as a centrifuge or agitator. No loading of gel cards into and out of a centrifuge is required. This eliminates the need for robotics to retrieve, tilt, or otherwise move test cells, and which generally requires a complex gripper mechanism and long, slow, three-dimensional traversals. Accordingly, throughput can be increased by ten times or greater. To further shorten processing time, microwells 500 may be read (e.g., stroboscopically on a sub-second timescale) while first carousel conveyor 110A is still spinning as a centrifuge. Alternatively, microwells 500 may be read while first carousel conveyor 110A is stationary. While this may reduce complexity within the system, it may also decrease the throughput rate of the automated system.

As discussed elsewhere herein, a carousel conveyor 110 may act as an agitator, in addition to a conveyor. For example, first carousel conveyor 110A may spin lightly after reagent (e.g., Anti-Human Globulin (AHG) reagent) has been added to a microwell 500 and before any tests are performed. This light spinning can force the reagent into the correct position at the end of well portion 520, eliminating the problem of "splash and bubble" that plagues current CAT testing. The correctness of the placement of the reagent, during or after agitation, may be validated by an automated reading station, prior to further processing (e.g., adding a sample, incubation, etc.).

A second carousel conveyor 110B may hold one or more rings of reagent containers. The reagent containers may be designed to be installed and removed individually or as racks (e.g., crescent racks) of multiple reagent containers. In an embodiment, a station may be provided at which reagent containers may be installed and/or accessed (e.g., read) on a segment of second carousel conveyor 110B that is accessible to the station, when second carousel conveyor 110B is stationary.

A third carousel conveyor 110C may hold one or more rings of sample or specimen containers (e.g., vacutainers containing blood from donors or patients). Preferably, third carousel conveyor 110C is more peripheral than and surrounds first carousel conveyor 110A and second carousel conveyor 110B, but this is not a requirement of conveyance system 100. The specimen containers may be designed to be installed and removed individually or as racks (e.g., crescent racks) of multiple specimen containers. In an embodiment, a station may be provided at which specimen containers may be installed and/or accessed on a segment of third carousel conveyor 110C that is accessible to the station, when third carousel conveyor 110C is stationary.

A fourth carousel conveyor 110D may hold a ring of vessels for processing specimens, such as making dilutions or cell suspensions. Alternatively, the specimen-processing vessels may be held on the third carousel conveyor 110C, along with the specimen containers, for example, on a radial line with the specimen container that the vessel will be used to process. In this case, the specimen-processing vessels are preferably farther from the center of conveyors 110 than the specimen containers, but may alternatively be closer to the center of conveyors 110 than the specimen containers. The specimen-processing vessels may be designed to be installed and removed individually or as racks (e.g., crescent racks) of specimen-processing vessels. In an embodiment, a station may be provided at which specimen-processing vessels may be installed and/or accessed on a segment of fourth carousel conveyor 110D that is accessible to the station, when fourth carousel conveyor 110D is stationary.

In the described embodiment, conveyance system 100 also comprises at least one automated pipetting station, which may be implemented as a bridge 120 that extends orthogonally over all of concentric carousel conveyors 110A-110D on a radial line. Thus, a segment from each of first through fourth carousel conveyors 110A-110D may be radially aligned under bridge 120, while all of carousel conveyors 110A-110D are stopped. During this radial alignment, a pipettor is configured to move radially on bridge 120, and is capable of stopping at each of positions 122A-122D to perform an operation at the underlying segment. The pipetting system may comprise one or more pipettors and/or a single channel or multi-channel pipettor, peristaltic or other types of pumps, pipettors in different orientations, and/or the like. At position 122A, the pipettor has access to at least one test cell on first carousel conveyor 110A, and preferably can make small steps along the radial line of bridge 120 to access a plurality of test cells in a radial line on first carousel conveyor 110A. Similarly, at position 122B, the pipettor has access to at least one reagent on second carousel conveyor 110B. Similarly, at position 122C, the pipettor has access to at least one specimen container on third carousel conveyor 110C. Similarly, at position 122D, the pipettor has access to at least one specimen-processing vessel on fourth carousel conveyor 110D (or third carousel conveyor 110C). Notably, any combination of test cell, reagent container, specimen container, and specimen-processing vessel can be obtained by rotating carousel conveyors 110A-110D relative to each other. Thus, the pipettor may aspirate from or dispense into any container on conveyors 110 via rotation of conveyors 110 and radial and vertical movement of the pipettor, under control of processing system 200. In this manner, any specimen sample may be mixed with any reagent in any test cell within conveyance system 100.

In an embodiment, the automated pipetting station may also comprise automated tip cleaning. For example, at position 122E, the pipettor may have access to a cleaning mechanism (e.g., implemented in apparatus 130), such as a stationary wash buffer. The pipettor may access the cleaning mechanism when appropriate to clean the tip of the pipettor. For example, whenever the pipettor needs to wash itself, the pipettor may slide along bridge 120 to a position above the wash buffer (e.g., position 122E), lower the pipettor tip into the wash buffer, aspirate washing fluid to perform self-cleaning, and then dispense the washing fluid (e.g., above a disposal buffer). Alternatively or additionally, the pipettor may have access to cell-suspension and/or dilution-making mechanisms (e.g., implemented in apparatus 130) at position 122E.

In an embodiment, conveyance system 100 may comprise a plurality of automated pipetting stations to increase throughput. For example, system 100 may comprise ten automated pipetting stations, with each station on a separate radial line. The radial lines may be adjacent to each other. In this case, if first carousel conveyor 110A is configured to hold ten test cells along each radial line, conveyance system 100 is able to simultaneously prepare a 10×10 batch of test cells at a time. It should be understood that the number of pipetting stations may be decreased or increased to any number, depending on the desired size and throughput rate of a particular conveyance system 100. Notably, the addition or removal of pipetting or other stations does not require any changes to conveyors 110. Thus, in an embodiment, the stations may be modular components that can be purchased as need and added by an operator after manufacture (e.g., after manufacture and purchase of conveyance system 100 or the automated system).

By one estimation, a conveyance system 100 with a 10-channel pipettor and capable of reading test results during spinning, could run 200 test panels (e.g., 200 radial lines, each comprising 10 test cells, for 2,000 test cells total) per hour with a single first carousel conveyor 110A. This far exceeds the throughput rate of even the fastest conventional CAT system. Furthermore, this throughput rate can be multiplied by adding any number of first carousel conveyors 110A to the implementation of conveyance system 100.

Conveyance system 100 may also comprise an automated reading station, which may be implemented as a second bridge 120 that extends orthogonally over all of concentric carousel conveyors 110A-110D on a radial line. Alternatively, the automated reading station could be combined with the automated pipetting station into a single bridge 120. The automated reading station may comprise a camera, spectrophotometer, or other sensor (e.g., fixed barcode readers configured to read barcodes on items on conveyors 110) at one or more positions (e.g., 122A-122D) to image or otherwise detect or measure parameters of items on conveyors 110A-110D respectively. For example, the detection device may be a stationary video-reading device that reads and records hemagglutination in multiple test cells (e.g., an entire rack 560) at the same time. In this manner, the automated reading station can gather data from assays represented by items on conveyors 110. In an embodiment, the automated reading station may gather the data as carousel conveyors 110 spin, for example, using stroboscopic light. This enables early reporting, for example, in emergency transfusion situations.

In an embodiment, conveyors 110 may be sized to hold the reagent and specimen containers for the entire active inventory of a typical blood bank. Thus, all of the reagent and specimen containers may be accessible to the automated system for autonomous processes (e.g., pre-transfusion testing). In addition, this enables autonomous inventory control, automated reordering (e.g., when reagent inventory is low), and autonomous quality control.

The automated system may comprise a housing that is approximately the size of a kitchen island (e.g., six feet by six feet) with concentric carousel conveyors 110 disposed inside. The housing may provide access to concentric carousel conveyors 110 from above for convenient loading and unloading of items. For example the housing may comprise an openable and closable panel that provides top-loading access to at least a portion of carousel conveyors 110. For safety purposes, the automated system may prevent access to conveyors 110 while conveyors 110 are moving.

The automated system may also comprise a processing system 200 that can be controlled remotely via communications over one or more networks. Thus, the automated system, including conveyors 110, may be remotely managed via a user system (e.g., personal desktop computer, mobile device such as a smartphone or tablet computer, server, etc.). In an embodiment, more than one user may operate the automated system at a time to independently rotate different conveyors 110 and/or utilize different stations (e.g., on different sides of conveyance system 100).

Such an automated system could replace the entire diagnostic operation (e.g., including technologists, laboratories, desks, etc.) of a hospital blood bank. The automated system could be scaled up to a larger version which is capable of handling the entire process for storing and issuing blood units for a large hospital blood bank, under the supervision of local and/or remote personnel. Alternatively, the automated system could be scaled down to a smaller version. Regardless of size, the control and analysis algorithms do not need to be altered.

As mentioned above, carousel conveyors 110A-110D may be coordinated so as to radially align segments, with their associated items, at one or more stations (e.g., bridge 120) for processing, such as pre-transfusion testing, random access testing, and/or reflex testing (e.g., based on algorithms or human direction for interpreting prior test results) in an automated blood-analysis system. The capabilities of such a system may far exceed the capabilities of current immunohematology (IH) analyzers, such as the BioRad IH1000™. For example, conventional CAT has focused on automated processing of gel cards (e.g., comprising six or eight wells) using complicated robotics. Advantageously, in an embodiment of an automated blood-analyzing system comprising conveyance system 100, with concentric carousel conveyors 110, the only robotic automation required is rotation of carousel conveyors 110 and movement of the pipettor for fluid handling (e.g., aspiration, aliquoting specimen samples, reagents, and other fluids, etc.). The static pipetting station and/or reading station cooperate with carousel conveyors 110 to serve each test performed by the automated blood-analyzing system.

Test cells, reagent containers, specimen containers, and/or specimen-processing vessels may be labeled with barcodes, near-field-communication (NFC) chips, RFID tags, or other machine-readable indicia that can be read by an automated reading station and which identify and/or describe the respective item. The automated reading station may read the indicia of an item at a position on carousel conveyor 110 (e.g., identified by a C-coordinate), and processing system 200 may store an association between the identifier of the item and the position (e.g., C-coordinate). Thus, processing system 200 may control a carousel conveyor 110 to deliver a particular item to a station for reading, pipetting, loading, unloading, and/or other processing.

One or more of the illustrated conveyors 110A-110D may comprise a plurality of conveyors 110. For instance, first carousel conveyor 110A, which is described as holding test cells, could comprise a plurality (e.g., two) concentric carousel conveyors 110 that each hold test cells. This duplication of conveyors 110 that hold the same type of items can minimize dwell time. Specifically, as one of these carousel conveyors 110 is being used in one process (e.g., loading or unloading, reading, aspiration or dispensation, as a centrifuge, other testing, etc.), other ones of these carousel conveyors 110 may be used in a different process. For example, as test cells are being loaded onto one of first carousel conveyors 110A, another one of first carousel conveyors 110A may be spun as a centrifuge. Processing system 200 may store and execute time-sharing algorithms that control the division of operations between the plurality of same-type conveyors 110, so as to minimize dwell time in which a process is waiting for a conveyor 110 to become available. In other words, the algorithms are programmed to minimize contention for the same-type conveyors 110.

One or more of the illustrated conveyors 110A-110D may be temperature-controlled. For example, first carousel conveyor 110A may comprise a metal surface that is heated (e.g., thermoelectrically) to impart heat of an appropriate temperature to incubate the test cells (e.g., at the customary temperature of 37° Celsius) for a measured time (e.g., 10 minutes), under control of processing system 200. In a linear batch process, in which radial lines 550 of test cells are steadily stepped under bridges 120, incubation times can be controlled, for example, by providing appropriate spacing between the bridge 120 of the automated pipetting station and the bridge 120 of the next processing station. For example, if ten minutes is required for incubation and first carousel conveyor 110A is stepped every ten seconds, the bridges 120 should be spaced apart by sixty radial lines.

Similarly, second carousel conveyor 110B and/or third carousel conveyor 110C may comprise a surface that is cooled to keep the reagents and/or specimens at temperatures that are appropriate for their preservation. For more precise temperature control, processing system 200 and each temperature-controlled conveyor 110 may be configured to adjust the temperature of specific segments of the conveyor 110 separately from other segments of the same conveyor 110. Thus, in addition to centrifugation and/or agitation, a carousel conveyor 110 may also act as an incubator, thereby eliminating the need for test cells, already in place on the carousel conveyor 110, to be robotically moved.

2. Process Overview

Embodiments of processes for controlling conveyance system 100 will now be described in detail. It should be understood that the described processes may be embodied in one or more software modules that are executed by one or more hardware processors (e.g., processor 210) of an automated system that comprises conveyance system 100. The described processes may be implemented as instructions represented in source code, object code, and/or machine code. These instructions may be executed directly by the hardware processor(s), or alternatively, may be executed by a virtual machine operating between the object code and the hardware processors.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

For the purposes of illustration, the processes will be described herein with reference to a conveyance system 100 comprising concentric carousel conveyors 110. However, this example is not limiting, and it will be readily apparent to a person of skill in the art how to adapt the described processes to other configurations of cooperating conveyors 110, including different numbers of conveyors 110, different shapes of conveyors 110 (e.g., adjacent linear conveyors 110), vertically stacked conveyors 110, and/or the like.

2.1. Item Loading

In an embodiment, one or more items may be labeled with machine-readable indicia (e.g., barcode, Quick Response (QR) code, alphanumeric string, NFC chip, RFID tag, etc.). At the time that these items are loaded on a conveyor 110, processing system 200 may automatically rotate conveyor 110, such that each segment on which an item is loaded passes through an automated reading station. The automated reading station may read the machine-readable indicia of the item on the segment of conveyor 110 that is currently accessible to the reading station (e.g., via an instrument 140, such as a camera, barcode reader, NFC chip, RFID interrogator, etc.), to identify the item. Because processing system 200 tracks each segment of conveyor 110 (e.g., via its PID), processing system 200 can also identify which segment is currently accessible to the reading station. Thus, processing system 200 may map an identifier of that item to an identifier of the segment (e.g., the C-coordinate of the segment) of the conveyor 110 on which it has been loaded. This mapped association may be stored (e.g., in memory 215 or 220) until the item is removed from conveyor 110. Advantageously, this association allows the item to be identified in subsequent operations based on its position on conveyor 110, and the position of an item on conveyor 110 to be retrieved using an identifier of the item. Each item within a rack 560 may be given a position identifier identifying its location within that rack 560 prior to rack 560 being loaded onto a conveyor 110. Once rack 560 has been placed onto conveyor 110, processing system 200 may compute the C-coordinate of each item within rack 560 based on the position of rack 560 on conveyor 110 and the position identifier of the item within the rack 560.

If the automated reading station is only capable of reading the machine-readable indicia while conveyor 110 is stationary, conveyor 110 may rotate to a first indexed position, stop for a sufficient time for the automated reading station to read the machine-readable indicia, rotate to a second indexed position, stop for a sufficient time for the automated reading station to read the next machine-readable indicia, rotate to a third indexed position, and so on and so forth. In an alternative embodiment, the automated reading station may be configured to read machine-readable indicia while conveyor 110 is rotating (e.g., via stroboscopic light). In this case, conveyor 110 may simply rotate as much as necessary for all of the machine-readable indicia on conveyor 110 to be read (e.g., a full or partial revolution), at a speed at which the automated reading station is able to read the machine-readable indicia (e.g., synchronized with the stroboscopic light).

2.2. Immunohematology (IH)

Figure 6:
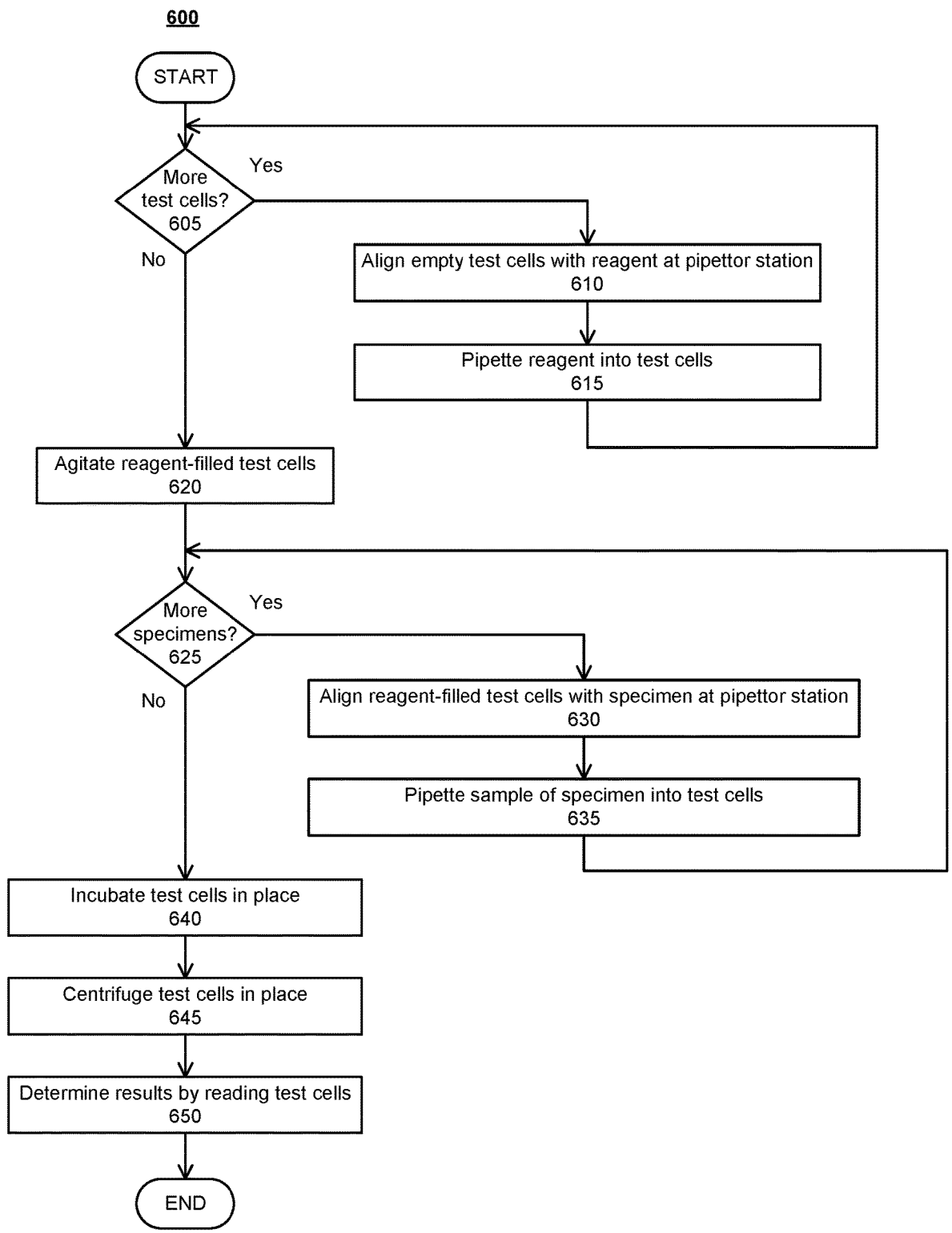
FIG. 6 illustrates the use of a conveyance system in a process for pre-transfusion IH testing, according to an embodiment.

FIG. 6 illustrates the use of conveyance system 100 in a process 600 for pre-transfusion IH testing, according to an embodiment. Process 600 may be implemented as one or more software modules stored and executed by processing system 200 (e.g., specifically by processor(s) 210) to control the components of conveyance system 100. Process 600 may occur after all utilized items have been loaded onto conveyors 110 or in parallel with the utilized items being loaded onto conveyors 110.

In step 605, processing system 200 determines whether any test cells need to be prepared. For example, processing system 200 may receive an instruction (e.g., via a user interface provided by the automated system) to perform one or more tests. In response to the instruction, processing system 200 may determine how many test cells need to be prepared. Then, in steps 610 and 615, processing system 200 may iteratively prepare each test cell that needs to be prepared. If any test cells remain to be prepared (i.e., "Yes" in step 605), process 600 proceeds to step 610. Otherwise, if no test cells remain to be prepared (i.e., "No" in step 605), process 600 proceeds to step 620.

In step 610, processing system 200 rotates one or both of first carousel conveyor 110A, holding test cells, and second carousel conveyor 110B, holding reagent containers, so that the next set of test cell(s) to be prepared are aligned with the appropriate reagent at the automated pipettor station. For example, processing system 200 may determine which reagent to be used in the preparation, identify a segment of second carousel conveyor 110B that holds that reagent, and rotate carousel conveyors 110A and/or 110B so that the identified segment of second carousel conveyor 110B is radially aligned with the set of test cell(s) to be prepared under bridge 120. At this time, processing system 200 could also rotate other conveyors 110 (e.g., third carousel conveyor 110C and/or fourth carousel conveyor 110D) to align segments of those conveyors 110, which will be needed for subsequent operations, with the aligned set of test cell(s) and reagent, at the automated pipettor station. Alternatively, this alignment may be done at a later time as needed.

In step 615, processing system 200 controls the pipettor to pipette reagent from the reagent container in the aligned segment of second carousel conveyor 110B into the set of test cell(s) in the aligned segment of first carousel conveyor 110A. More specifically, the pipettor is moved along bridge 120 to position 122B above the reagent container, the pipettor tip is lowered into the reagent container, an appropriate amount of reagent is aspirated into the pipettor, the pipettor tip is raised, the pipettor is moved along bridge 120 to position 122A above a test cell, the pipettor tip is lowered into the test cell (e.g., into the opening in receptacle portion 510 of a microwell 500), an appropriate aliquot of reagent is dispensed into the test cell, and the pipettor tip is raised. This process may be repeated multiple times for each test cell in the aligned set of test cell(s) on first carousel conveyor 110A. However, for efficiency, the pipettor may aspirate an amount of reagent that is sufficient for multiple test cells (e.g., sufficient for 100 test cells), such that the pipettor may dispense reagent into a plurality of test cells (e.g., along a radial line under bridge 120) without returning to the reagent container. In this case, the pipettor may step radially across the aligned segment of first carousel conveyor 110A from one end of a line 550 of test cells to the opposite end of the line 550 of test cells (e.g., from innermost test cell to outermost test cell). The pipettor may perform self-cleaning (e.g., using a wash buffer as discussed elsewhere herein) as needed (e.g., before aspiration of any reagent).

In step 610, if a set of test cell(s) need to be filled with a plurality of reagents (e.g., for multiplexed testing within the same microwell 500), first carousel conveyor 110A may be held stationary, while second carousel conveyor 110B is stepped to the segment holding the next reagent container, over a plurality of iterations of steps 610 and 615. On the other hand, if a plurality of sets of test cell(s) need to be filled with the same reagent, second carousel conveyor 110B may be held stationary, while first carousel conveyor 110A is stepped to the segment holding the next set of test cell(s), over a plurality of iterations of steps 610 and 615.

In step 620, processing system 200 may control first carousel conveyor 110A to agitate the test cells, into which reagent has been dispensed, to force the reagent into the appropriate position (e.g., within well portion 520 of each microwell 500). This agitation may comprise gently spinning first carousel conveyor 110A at low RPM. If such agitation is not required for a particular test, step 620 may be omitted.

In step 625, processing system 200 determines whether any specimens need to be tested. For example, processing system 200 may receive an instruction (e.g., via a user interface provided by the automated system) to perform one or more tests on one or more specimens. In response to the instruction, processing system 200 may determine the locations of specimens to be tested. Then, in steps 630 and 635, processing system 200 may iteratively prepare each sample that needs to be prepared from the located specimens. If any specimens remain to be prepared (i.e., "Yes" in step 625), process 600 proceeds to step 630. Otherwise, if no specimens remain to be prepared (i.e., "No" in step 625), process 600 proceeds to step 640.

In step 630, processing system 200 rotates one or both of the first carousel conveyor 110A, holding reagent-filled test cells, and third carousel conveyor 110C, holding specimen containers, so that a set of reagent-filled test cell(s) is aligned with the next specimen to be prepared at the automated pipettor station. For example, processing system 200 may identify a segment of third carousel conveyor 110C that holds the next specimen, identify a segment of first carousel conveyor 110A that holds a set of reagent-filled test cell(s) to be used for that specimen, and rotate carousel conveyors 110A and/or 110C so that the identified segment of third carousel conveyor 110C is radially aligned with the set of test cell(s) to be used under bridge 120. In an embodiment that uses fourth carousel conveyor 110D to hold specimen-processing vessels, fourth carousel conveyor 110D may be similarly rotated to also move a segment of fourth carousel conveyor 110, holding the specimen-processing vessels to be used, into alignment under bridge 120. Alternatively, as discussed elsewhere herein, specimen-processing vessels may be installed radially next to their associated specimen containers on third carousel conveyor 110C.

In step 635, processing system 200 controls the pipettor to pipette a sample into the set of test cell(s) in the aligned segment of first carousel conveyor 110A. More specifically, the pipettor is moved along bridge 120 to position 122C above the specimen container, the pipettor tip is lowered into the specimen container, an appropriate sample of the specimen is aspirated into the pipettor, the pipettor tip is raised, if necessary the sample is prepared using specimen-processing vessels, the pipettor is moved along bridge 120 to position 122A above a test cell, the pipettor tip is lowered into the test cell (e.g., into the opening in receptacle portion 510 of a microwell 500), an appropriate aliquot of the sample is dispensed into the test cell, and the pipettor tip is raised. This process may be repeated multiple times for each test cell in the aligned set of test cell(s) on first carousel conveyor 110A to be used for testing the sample. However, for efficiency, the pipettor may aspirate an amount of the sample that is sufficient for multiple test cells, such that the pipettor may dispense an aliquot of the sample into a plurality of test cells (e.g., along a radial line under bridge 120) without having to collect more of the sample. In this case, the pipettor may step radially across the aligned segment of first carousel conveyor 110A from one end of a line 550 of test cells to the opposite end of the line 550 of test cells (e.g., from innermost test cell to outermost test cell). The pipettor may perform self-cleaning (e.g., using a wash buffer as discussed elsewhere herein) as needed (e.g., before aspiration of any sample).

As mentioned above, in some cases the sample of the specimen may be prepared using specimen-processing vessels, before being dispensed into test cells. For instance, the pipettor may dispense the sample into a specimen-processing vessel (e.g., at position 122D under bridge 120) to make a dilution or cell suspension using the specimen. Similarly, the pipettor may obtain (e.g., via aspiration, a connected fluid system, etc.) any other fluid(s) necessary for the dilution or cell suspension, and dispense those fluid(s) into the specimen-processing vessel. The pipettor may then aspirate the dilution or cell suspension as the sample to be dispensed into the set of test cell(s).

In step 630, if a set of test cell(s) need to be filled with a plurality of samples, first carousel conveyor 110A may be held stationary, while third carousel conveyor 110C is stepped to the segment holding the next specimen container, over a plurality of iterations of steps 630 and 635. On the other hand, if a plurality of sets of test cell(s) need to be filled with the same sample, third carousel conveyor 110C may be held stationary, while first carousel conveyor 110A is stepped to the segment holding the next set of test cell(s), over a plurality of iterations of steps 630 and 635.

In step 640, processing system 200 may control first carousel conveyor 110A to incubate the sample-filled test cells. This incubation may comprise increasing the temperature of at least those segments of first carousel conveyor 110A that hold the sample-filled test cells. Alternatively or additionally, this incubation may comprise rotating the segments of first carousel conveyor 110A that hold the sample-filled test cells into a portion of conveyance system 100 that is temperature-controlled for incubation. The incubation period may be set to an appropriate time period (e.g., ten minutes). Once the incubation period ends, process 600 may proceed to step 645. Notably, numerous test cells (e.g., 1,000 test cells) may be simultaneously incubated. In addition, agitation may be applied (e.g., by gently spinning first carousel conveyor 110A at low RPM) to shorten the required incubation period. If incubation is not required for a particular test, step 640 may be omitted.

In step 645, processing system 200 may control first carousel conveyor 110A to act as a centrifuge. Specifically, processing system 200 may accelerate and spin first carousel conveyor 110A at high RPM (e.g., greater than or equal to 1,500 RPM, 1,600 RPM, 2,000 RPM, 4,000 RPM, etc.), designed to exert an appropriate amount of centrifugal force on the test cells being held on first carousel conveyor 110A. The precise RPMs to be used for centrifugation may depend on the size of first carousel conveyor 110A (e.g., 4,000 RPM on an 11-inch conveyor 110A, 1,600 RPM on a 6-foot conveyor 110A, etc.). Notably, centrifugation is part of CAT testing. If centrifugation is not required for a particular test, step 645 may be omitted.

In step 650, processing system 200 determines the results of the testing. The results may be acquired as the output from an automated reading station (e.g., implemented as a bridge 120). In an embodiment, the automated reading station may read the results during step 645 (i.e., as first carousel conveyor 110A is spinning as a centrifuge). This may be done using stroboscopic light. Alternatively, the automated reading station may read the results after step 645, while processing system 200 rotates first carousel conveyor 110A, in stepwise fashion, so that the automated reading station may read the results of a test cell while first carousel conveyor 110A is stationary. In either case, processing system 200 may interpret and report the results to an LIS (e.g., via an API of the LIS and/or over at least one network between the automated system and LIS) and/or a user (e.g., in a graphical user interface provided by the automated system).

2.3. Software

Processing system 200 may store and execute one or more software modules (e.g., stored in main memory 215 and/or secondary memory 220, and executed by processor(s) 210) that control conveyance system 100. This control may comprise optimizing the timing of movements of conveyors 110 relative to each other and operations being performed (e.g., minimizing dwell time and increasing throughput), implementing required lead times for processing (e.g., to fill tests cells with the appropriate reagent in advance of a scheduled test), selecting items for processing, bringing together a collection of items for processing, and/or the like.

In an embodiment, the control software may utilize artificial intelligence to anticipate the intentions of the automated system and/or human users. For example, the control software may train a machine-learning algorithm to predict the next operation to be performed based on an observed series of events, using historical datasets that have been observed and stored. Additionally or alternatively, artificial intelligence (e.g., employing neural networks) may be used to recognize and/or classify objects in image data captured by one or more reading stations.

Processing system 200 may also store and execute one or more software modules (e.g., stored in main memory 215 and/or secondary memory 220, and executed by processor(s) 210) to analyze data, including sensed results, produced by the automated system (e.g., by the instruments 140 of one or more stations). This analysis may comprise determining and interpreting the results of tests (e.g., based on image data of microwells 500 captured by a camera of a reading station), inventorying items (e.g., based on image data of machine-readable indicia captured by a camera of a reading station), mapping items to locations (e.g., C-coordinates), mapping C-coordinates to G-coordinates (e.g., updating PIDs), and/or the like. For example, with respect to interpreting the results of tests, the analysis software may be configured to (e.g., based on imaging of microwells 500) distinguish agglutinated red-blood cells from non-agglutinated red-blood cells, detect ligand-antibody interactions in which either the ligand or antibody is labeled with a chromophore, fluorophore, or similar label that is detectable in the visible, infrared, and/or ultraviolet light spectra, and/or the like.

Notably, the same control and analysis software can be used by processing system 200, regardless of the size of the automated system. Thus, the automated system can be scaled up or down as needed or desired for a particular application, without having to develop new software. Regardless of the size of the automated system, the software will optimize operation of conveyance system 100 and analyze the data produced by conveyance system 100.

For example, the automated system may be provided in small, medium, and/or large units. In the clinical setting, the small unit may be sufficient for small-volume, low-throughput laboratory applications. Such a unit may be sized to process five to six tests per specimen, with a capacity of twelve to twenty specimens. It could serve both routine and emergency requests for various panels (e.g., kidney function tests, cardiac tests, liver tests, toxicology tests, etc.). Larger sizes of units may be provided for use in clinical research labs in the academic setting, as well as industrial analytical laboratories and industrial production laboratories (e.g., for quality control of the production line or production batches of drugs, internal monitoring of parameters for Good Laboratory Practice (GLP) or Good Manufacturing Practice (GMP) regulations, etc.).

The diagnostic testing processes on a carousel conveyor 110 can often be divided into two phases which cannot be operational at the same time: (1) loading items (e.g., test cells, reagent, samples) on the carousel conveyor 110; and (2) spinning the carousel conveyor 110 as a centrifuge. This can increase dwell time and reduce throughput. For example, when loading items, pipetting into test cells, or incubating test cells, the respective carousel conveyor 110 must either be stationary or rotating at low RPM. Conversely, when spinning a carousel conveyor 110 as a centrifuge, items cannot be loaded, pipetted, or incubated on the respective carousel conveyor 110. Since centrifugation can require significant time (e.g., ten minutes), throughput is diminished. Similarly, while reagent or sample containers are being loaded onto a carousel conveyor 110, the carousel conveyor 110 cannot be rotated to move a particular item to a station (e.g., for pipetting, reading, etc.)

Thus, in an embodiment, a plurality of independently operable carousel conveyors 110 (e.g., two first carousel conveyors 110A) are used for one or more types of items (e.g., test cells). Thus, for example, while one first carousel conveyor 110A is spinning at high RPM as a centrifuge, test cells may be loaded, unloaded, incubated, or otherwise operated upon on another one of the first carousel conveyors 110A which is stationary or spinning at low RPM. As another example, while one carousel conveyor 110B or 110C is delivering a reagent or sample container to a station, reagent or sample containers can be loaded or unloaded from the other carousel conveyor 110B or 110C. In other words, multiple batches of the same type of item may be processed on separate carousel conveyors 110.

The control software may optimize this time sharing between the plurality of carousel conveyors 110 that share the same type of item, to minimize dwell time. For example, processing system 200, executing the control software, may monitor what processes are active on each carousel conveyor 110 at any given time. When no processes are active on a particular carousel conveyor 110 that requires the carousel conveyor 110 to remain stationary, processing system 200 may automatically rotate the carousel conveyor 110 to position segments of the carousel conveyor that are empty or occupied with outdated items (e.g., used and previously read test cells, empty reagent or sample containers, etc.) for easier access by an operator (e.g., closer to an openable access point of the automated system) or other system (e.g., a robotic loading/unloading system) for quicker loading and/or unloading.

Similarly, when it would not interrupt any active processes, the control software, executed by processing system 200, may automatically rotate one or more carousel conveyors 110 to minimize the distance between the positions of frequently used items and a station at which those frequently used items are operated upon. For example, during a period of inactivity, the control software may automatically rotate a segment of second carousel conveyor 110B, holding a frequently used reagent, so that is aligned with an automated pipetting station. This can decrease the lead time required to start a new operation that involves the frequently used reagent.

In an embodiment, the control software may also optimize operations for scheduled operations. For example, if a plurality of tests are scheduled for a given time and each test requires certain preparations before the test can be initiated, the control software, executed by processing system 200, may prioritize the preparations according to lead time. Thus, preparations for the test with the longest lead time may be given the highest priority and be performed first, whereas the test with the shortest lead time may be given the lowest priority and be performed last.

The control software may also be sensitive to historical time-of-day loads. For example, the control software may store historical usage data for the automated system, and use that historical usage data to anticipate upcoming needs. For example, if certain tests are regularly performed at a certain time on a certain day, the control software, executed by processing system 200, may automatically begin preparations for such tests (e.g., filling test cells with reagent) with sufficient lead time, such that the preparations will be completed at approximately the particular time on the particular day at which the tests are regularly performed.

2.4. Specific Example

To aid in understanding, a specific, non-limiting example of how conveyance system 100 may be used for a single AHG test will now be described. Assume that a blood bank needs to know, as part of a donor workup, whether the blood of a particular donor is blood group Kell negative. This is done by phenotyping the donor's blood for the Kell antigen by testing the donor's red-blood-cell suspension using reagent anti-K antibody using the indirect AHG method.

A technician of the blood bank may utilize a remote user system to instruct the automated system (e.g., via one or more public and/or private networks, potentially including the Internet) to perform this test on the donor's specimen, which has been loaded onto a carousel conveyor 110 holding specimens (e.g., third carousel conveyor 110C) or which is archived as an active sample already on a carousel conveyor (e.g., third carousel conveyor 110C). In response to the instruction, processing system 200, executing the control software, will automatically perform several coordinated procedures:

(1) Rotate the donor's specimen and an empty red-blood-cell suspension vessel, on the same or separate carousel conveyors 110, to a pipetting station;

(2) At and by the pipetting station, make a 1% red-blood-cell suspension, in the suspension vessel, from the donor's specimen;

(3) Rotate an anti-K reagent container, on a separate carousel conveyor 110, to the pipetting station;

(4) Prepare a fresh AHG-gel test cell and rotate the test cell, on a separate 37° C. temperature-controlled carousel conveyor 110, to the pipetting station;

(5) At and by the pipetting station, aspirate 50 microliters of anti-K reagent and dispense it into the test cell;

(6) Agitate the carousel conveyor 110, holding the test cell, to thoroughly mix the anti-K reagent with the AHG gel;

(7) Incubate the test cell, on the 37° C. temperature-controlled carousel conveyor 110 at 37° C. for 15 minutes;

(8) Centrifuge the carousel conveyor 110, holding the test cell, at a controlled speed for 10 minutes;

(9) At a reading station, during the centrifugation, read the test cells; and

(10) Once the test cells have been read, record the results and report to the blood bank's screener.

2.5. Other Applications

Disclosed embodiments may be utilized and adapted for other applications than those described above. For instance, any system, which must coordinate the movements of disparate items for a particular purpose or re-sort items into new locations, can benefit from the disclosed conveyance system 100. Such systems include, without limitation, testing water samples for environmental monitoring of water quality, assembling components into a product on a manufacturing production line, the preparation of various dishes in a restaurant kitchen, assembling outfits for a personal shopper in a high-end clothing store, assembling a shopping list for bagging and convenient checkout in a store (e.g., grocery store, electronics store, convenience store, etc.), assembling products from an online shopping cart into a package for shipping, and/or the like.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A transport system for use in a diagnostic testing system comprising:
a plurality of conveyors, wherein each of the plurality of conveyors comprises a plurality of segments configured to hold at least one item;
one or more stations, wherein each of the one or more stations comprises one or more instruments;
wherein at least one item is configured to hold test cells, wherein each test cell comprises one or more microwells,
each microwell comprises a receptacle portion and a well portion,
the well portion is configured to rest horizontally on a top surface of the at least one conveyor, and
the receptacle portion comprises an opening that is accessible to the one or more instruments while the well portion is resting horizontally on the top surface of the at least one conveyor;
each test cell comprises a plurality of microwells arranged in an annulus sector, the annulus sector is configured to be attachable to and detachable from the top surface of the at least one conveyor, such that, upon the annulus sector being attached to the top surface of the at least one conveyor, the plurality of microwells longitudinally extend along a radial line of the plurality of conveyors, and a peripheral curve of the annulus sector matches a peripheral curve of the top surface of the at least one conveyor;
at least one hardware processor; and
software configured to, when executed by the at least one hardware processor,
receive an instruction to perform an operation that requires at least one of the one or more stations to simultaneously process at least a first item held by a first segment of a first one of the plurality of conveyors and a second item held by a second segment of a second one of the plurality of conveyors,
in response to receiving the instruction, control one or both of the first conveyor and the second conveyor to move, such that the first segment and the second segment are aligned at the at least one station at a same time, and
after the first segment and the second segment have been aligned at the at least one station, control the one or more instruments of the at least one station to simultaneously process the first item and the second item.

2. The system of claim 1, wherein the plurality of conveyors comprises a plurality of concentric circular conveyors that each has a different radius, and wherein, in plan view, all but one of the plurality of concentric circular conveyors is nested within another one of the plurality of concentric circular conveyors.

3. The system of claim 2, wherein at least one of the plurality of concentric circular conveyors is configured to hold test cells for blood testing, and wherein the software is configured to, when executed by the at least one hardware processor, control the at least one concentric circular conveyor to spin as a centrifuge.

4. The system of claim 3, wherein spinning as a centrifuge comprises spinning at 1,500 revolutions per minute or greater.

5. The system of claim 2, wherein at least one of the plurality of concentric circular conveyors is configured to hold test cells for blood testing, and wherein the software is configured to, when executed by the at least one hardware processor, control the at least one concentric circular conveyor to agitate the test cells by, alternately and repeatedly, accelerating in a first direction and decelerating to a stop, and then accelerating in a second direction, which is opposite the first direction, and decelerating to a stop.

6. The system of claim 1, wherein each of the plurality of conveyors is configured to rotate in two directions, and wherein the software is configured to, when executed by the at least one hardware processor:
determine in which of the two directions to rotate at least one of the first conveyor and the second conveyor so as to minimize movement; and
control the at least one of the first conveyor and the second conveyor to rotate in the determined direction.

7. The system of claim 1, wherein the plurality of conveyors comprises the first conveyor, the second conveyor, and a third conveyor, wherein the first conveyor is configured to hold test cells, the second conveyor is configured to hold reagent containers, and the third conveyor is configured to hold specimen containers, wherein the one or more instruments comprise a pipettor, and wherein the software is configured to, when executed by the at least one hardware processor:
while the first conveyor and the second conveyor are aligned at the at least one station, control the pipettor to move over a reagent container on the second segment of the second conveyor, aspirate an amount of reagent from the reagent container on the second segment, move over a test cell on the first segment of the first conveyor, and dispense the amount of reagent into the test cell on the first segment; and,
while the first conveyor and the third conveyor are aligned at the at least one station, control the pipettor to move over a specimen container on a third segment of the third conveyor, aspirate an amount of specimen from the specimen container, prepare a sample from the specimen, move over the test cell on the first segment, and dispense the sample into the test cell on the first segment.

8. The system of claim 7, wherein the first conveyor is nested within the second conveyor, and wherein the second conveyor is nested within the third conveyor.

9. The system of claim 7, wherein each of the first conveyor, the second conveyor, and the third conveyor is configured to rotate independently under control of the software.

10. The system of claim 1, wherein one or more of the plurality of conveyors comprises a thermoelectric cooling component that cools a top surface of the one or more conveyors on which items are held.

11. The system of claim 1, wherein each of the plurality of conveyors is configured to stop at each of a plurality of indexed positions.

12. The system of claim 1, wherein the one or more instruments of at least one of the one or more stations comprises a reader device configured to read a characteristic of a third item on a segment of at least one of the plurality of conveyors.

13. The system of claim 12, wherein the reader device comprises a camera configured to capture an image of a machine-readable indicia on the third item, and wherein the software is configured to, when executed by the at least one hardware processor:
   identify the third item from the image;
   identify the segment of the at least one conveyor on which the third item is held; and
   map an identifier of the third item to an identifier of the identified segment.

14. The system of claim 13, wherein the identifier of the identified segment comprises C-coordinates that uniquely identify a location on the at least one conveyor on which the third item is held, and wherein the software is configured to, when executed by the at least one hardware processor, map the C-coordinates to G-coordinates that uniquely identify a location of the identified segment within an automated system.

15. The system of claim 12, wherein the third item comprises a microwell, wherein the reader device comprises a camera configured to capture an image of the microwell, and wherein the software is configured to, when executed by the at least one hardware processor analyze the image of the microwell to determine a test result.

16. The system of claim 15, wherein the camera is configured to capture the image of the microwell while the microwell is spinning on the at least one conveyor.

17. A method comprising using at least one hardware processor, within the transport system of claim 1, programmed to:
   receive an instruction to perform an operation that requires the at least one of the one or more stations to simultaneously process at least the first item held by the first segment of the first one of the plurality of conveyors and the second item held by a second segment of the second one of the plurality of conveyors; in response to receiving the instruction, control one or both of the first conveyor and the second conveyor to move, such that the first segment and the second segment are aligned at the at least one station at a same time; and
   after the first segment and the second segment have been aligned at the at least one station, control the one or more instruments of the at least one station to simultaneously process the first item and the second item.

18. A non-transitory computer-readable medium having instructions stored therein, wherein the instructions, when executed by the hardware processor, within the transport system of, cause the processor to:
   receive an instruction to perform an operation that requires the at least one of the one or more stations to simultaneously process at least the first item held by the first segment of a first one of the plurality of conveyors and the second item held by the second segment of the second one of the plurality of conveyors;
   in response to receiving the instruction, control one or both of the first conveyor and the second conveyor to move, such that the first segment and the second segment are aligned at the at least one station at a same time; and
   after the first segment and the second segment have been aligned at the at least one station, control the one or more instruments of the at least one station to simultaneously process the first item and the second item.

* * * * *